US011238105B2

(12) United States Patent
Wang et al.

(10) Patent No.: US 11,238,105 B2
(45) Date of Patent: Feb. 1, 2022

(54) CORRELATING USER DEVICE ATTRIBUTE GROUPS

(71) Applicant: salesforce.com, inc., San Francisco, CA (US)

(72) Inventors: Xingyu Wang, San Francisco, CA (US); Gloriose Hitimana, London (GB); David Yourdon, Durham, NC (US); Nathan Irace Burke, Brooklyn, NY (US); Jonathan Budd, London (GB)

(73) Assignee: salesforce.com, inc., San Francisco, CA (US)

( * ) Notice: Subject to any disclaimer, the term of this patent is extended or adjusted under 35 U.S.C. 154(b) by 375 days.

(21) Appl. No.: 16/370,360

(22) Filed: Mar. 29, 2019

(65) Prior Publication Data

US 2020/0311143 A1    Oct. 1, 2020

(51) Int. Cl.
*G06F 16/9035* (2019.01)
*G06F 16/903* (2019.01)
*G06F 16/901* (2019.01)
*G06F 17/15* (2006.01)

(52) U.S. Cl.
CPC ........ *G06F 16/9035* (2019.01); *G06F 16/901* (2019.01); *G06F 16/90335* (2019.01); *G06F 17/15* (2013.01)

(58) Field of Classification Search
CPC ............... G06F 16/9035; G06F 16/901; G06F 16/90335; G06F 17/15
See application file for complete search history.

(56) References Cited

U.S. PATENT DOCUMENTS

| 7,660,707 | B2 * | 2/2010 | Maruyama | G06K 9/6297 703/2 |
| 9,800,365 | B2 * | 10/2017 | Myung | H04L 27/34 |
| 10,305,687 | B2 * | 5/2019 | Unruh | H04L 9/3271 |
| 2008/0059491 | A1 * | 3/2008 | Gatti | G06F 16/258 |
| 2011/0276759 | A1 * | 11/2011 | Chien | G06F 3/061 711/114 |
| 2012/0078894 | A1 * | 3/2012 | Jiang | G06F 16/7847 707/723 |
| 2014/0269382 | A1 * | 9/2014 | Ryan | H04W 24/04 370/252 |
| 2015/0172425 | A1 * | 6/2015 | Woodruff | G06F 16/22 709/230 |
| 2016/0057020 | A1 * | 2/2016 | Halmstad | H04L 67/26 715/740 |

(Continued)

*Primary Examiner* — Ashish Thomas
*Assistant Examiner* — Abdullah A Daud
(74) *Attorney, Agent, or Firm* — Holland & Hart LLP

(57) ABSTRACT

A database server may perform reach potential analysis for a local segment, or a target audience, of a data set. The local segment may include user devices which share a specific, common attribute. The database server may calculate similarities and correlations between a first data set for a user and a second data set from a data provider. The database server may calculate a reach index using the second data set from the data provider to determine whether user devices are likely to join the local segment by taking on the specific attribute which defines the local segment. Using the data set from the data provider, the database server may determine a reach potential within the first data set, outside of the first data set, or both.

17 Claims, 14 Drawing Sheets

(56) References Cited

U.S. PATENT DOCUMENTS

| | | | |
|---|---|---|---|
| 2016/0110826 A1* | 4/2016 | Morimoto | G06F 16/93 |
| | | | 705/311 |
| 2017/0091812 A1* | 3/2017 | Wong | G06Q 30/0253 |
| 2017/0169174 A1* | 6/2017 | Yeung | G16H 50/20 |
| 2017/0270115 A1* | 9/2017 | Cormack | G06N 20/00 |
| 2017/0300963 A1* | 10/2017 | Dabbiru | H04L 67/42 |
| 2018/0060546 A1* | 3/2018 | Yin | H04W 4/021 |
| 2018/0234234 A1* | 8/2018 | Hurley | G06F 21/10 |
| 2019/0327303 A1* | 10/2019 | Chen | H04L 67/1027 |
| 2020/0015082 A1* | 1/2020 | Xie | H04W 12/122 |
| 2020/0219333 A1* | 7/2020 | Simoncini | G08G 1/20 |
| 2020/0302596 A1* | 9/2020 | Yoo | G06T 7/11 |

* cited by examiner

CORRELATING USER DEVICE ATTRIBUTE GROUPS

FIELD OF TECHNOLOGY

The present disclosure relates generally to database systems and data processing, and more specifically to correlating user device attribute groups.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

A cloud platform may determine patterns or correlations between various data sets and display the results to a user. The cloud platform may perform the analysis based on features, attributes, or sources of the data sets to determine results and correlations across the data sets that are meaningful to a user. Systems where analysts select which attributes or features of a data set should be observed may fail to capture useful information, for example due to human biases, as these systems may fail to perform analysis beyond the selected attributes or features.

DETAILED DESCRIPTION

Figure 1:
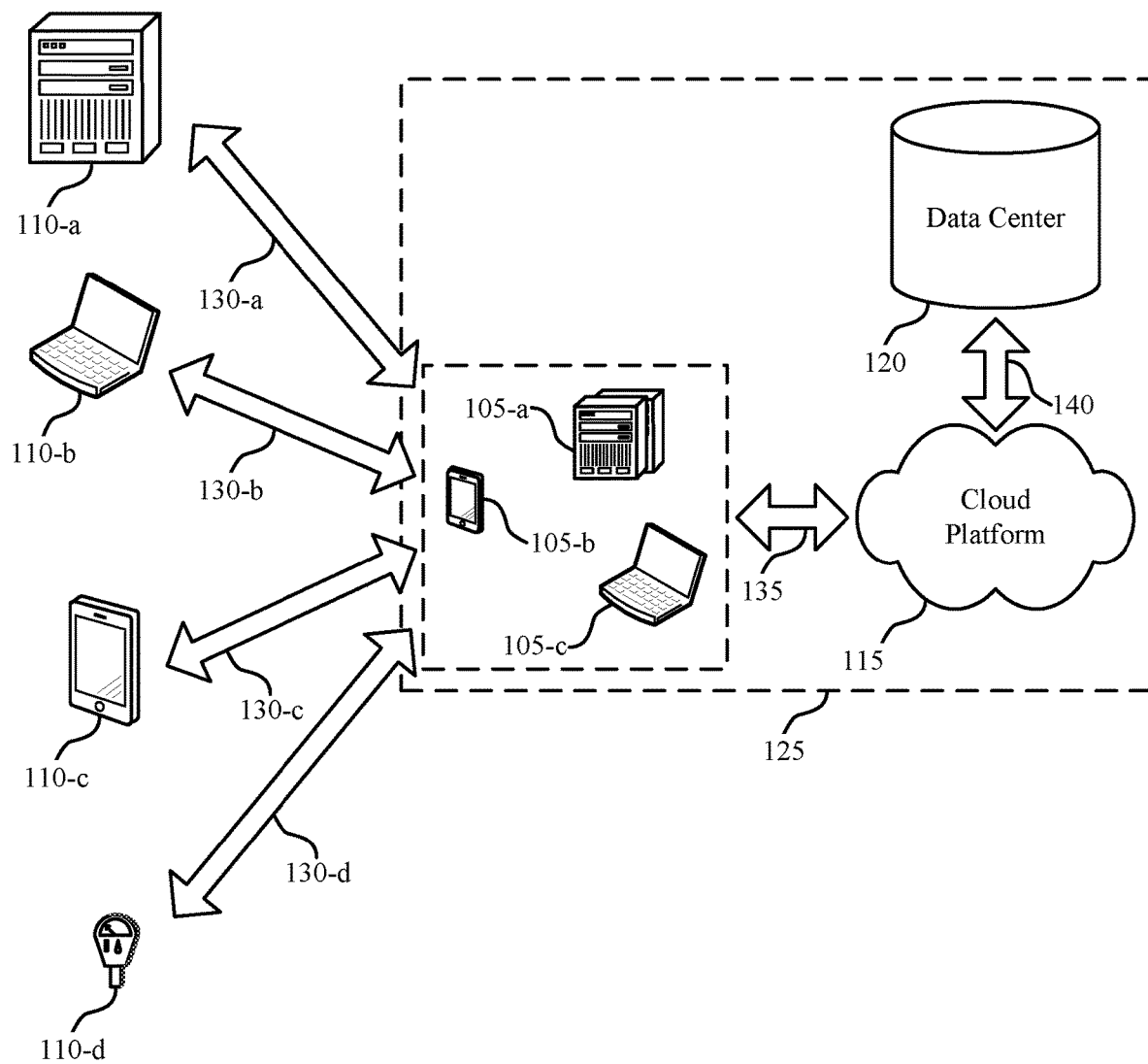
FIG. 1 illustrates an example of a system for data processing that supports correlating user device attribute groups in accordance with aspects of the present disclosure.

In some database systems, a cloud platform may determine patterns and correlations between various data sets and efficiently display the results to a user. The cloud platform may use a multi-tenant database system with multiple users, where each user may in turn be associated with multiple tenants or multiple devices. Data may be gathered from various users of the multi-tenant database system and may include, for example, browser data, application data, usage data, and the like. Upon gathering the data, the cloud platform may perform analysis (e.g., frequent pattern (FP) analysis) on the data to determine patterns and correlations between different subsets of the data based on features, attributes, or sources of the data. The cloud platform may effectively decipher and analyze data sets acquired from multiple different users or organizations to determine results and correlations across the data sets that are meaningful to a user. The cloud platform may then display the results to the user via a user interface.

In an example, a client associated with an organization may be interested in growing a target audience in the organization. The organization may already have some user devices associated with the target audience, and this group of user devices may be referred to as a local segment. Some cloud platforms may analyze whether there is potential growth for the target audience within users already in the organization. If too many user devices in the organization are in the local segment, there may be few remaining users of the organization which would be able to join the local segment. Or, if very few user devices of the organization are in the local segment, it may be an indicator that users in the organization are generally uninterested in joining the local segment. Somewhere in between (e.g., where approximately half of the organization is in the target audience) may result in a strong potential reach within the organization for new users to join the target audience. The client may use this information when determining whether to push advertisements to expand the target audience or to ween away from advertising based on this reach potential.

Conventional techniques may provide some insight for identifying a defining attribute of a segment within a data set by analyzing only the data set of user devices in the organization. However, there may be even greater potential insights, such as additional reach potential options, when utilizing an additional data set in the analysis. For example, by using an external data set (e.g., third party data or data from a data provider) in the reach analysis, the analysis may support determining reach potential to grow the target audience with users outside of (e.g., not a part of) the organization. By performing reach analysis using an external data set (e.g., from the data provider), the database server may provide more detailed reach potential analysis for a much larger set of users outside of the known data set (e.g., first and/or second party data) of the organization. The data sets from the data provider may be based on a specific feature. When determining reach potential outside of the organization, the cloud platform may consider how similar the organization population is to a data provider feature population, as well as how the local segment overlaps with the data provider feature population. Using a data provider data set may also provide additional insight into reach potential within the organization. The cloud platform may determine which of the data provider feature populations have the greatest potential reach inside the organization, outside the organization, or some combination thereof. Similar to intra-organization analysis, if the local segment has too weak or too strong of an overlap with a data provider feature population, the reach potential for that data provider feature population may be low. The analysis for the reach potential outside of the organization may be displayed to the user in a user interface.

Aspects of the disclosure are initially described in the context of an environment supporting an on-demand database service. Aspects of the disclosure are further illustrated by and described with reference to apparatus diagrams, system diagrams, and flowcharts that relate to correlating user device attribute groups.

FIG. 1 illustrates an example of a system 100 for cloud computing that supports correlating user device attribute groups in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135 and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some cases, a database server (e.g., at a cloud platform 115) may determine patterns and correlations between various data sets. The data sets may correspond to a multi-tenant database system with multiple users, where each user may in turn support multiple devices. In some cases, data for cloud clients 105, contacts 110, or other devices may be included in the data sets. Data may be gathered from various users of the multi-tenant database system and may include, for example, browser data, application data, usage data, and the like. Upon gathering the data, the cloud platform 115 may perform analysis (e.g., FP analysis) on the data to determine patterns and correlations between different subsets of the data based on features, attributes, or sources of the data. One or more of the data sets may, in some cases, be stored in a data center 120 of the subsystem 125. The cloud platform 115 may effectively decipher and analyze data sets acquired from multiple different users or organizations to determine results and correlations within a data set or across the data sets. The cloud platform 115 may then display the results to a user via a user interface on a user device (e.g., a cloud client 105).

In an example, an analyzing user, such as a cloud client 105, may be associated with an organization and interested in growing a target audience in the organization. The organization may correspond to a tenant of a multi-tenant database, and the multi-tenant database may store data for users (e.g., members, customers, clients, etc.) of the organization. This data may be first party data, second party data, or a combination of the two. Each user of the organization may be associated with one or more devices, such as mobile devices, computers, tablets, smart devices, etc. In some cases, the cloud client 105 may provide a data set for the organization to the cloud platform 115. The organization may already have some user devices in the target audience, and this group of user devices may be referred to as a local segment. The local segment may be identified based on user devices in the local segment sharing a common attribute, trait, or feature. In some cases, multiple devices in the local segment may be associated with a single user (e.g., a single user owns or operates the multiple devices). In a non-limiting example, the common attribute may be "frequently purchases from a certain store," where each user device in the local segments is associated with making purchases at the certain store. The analyzing user may therefore be interested in increasing the number of user devices in the local segment, for example, by increasing the number of user devices in the organization that make purchases at that certain store.

Some systems may analyze whether there is potential growth for the target audience within user devices already in the organization. As an example, if too many user devices in the organization are in the local segment, there may be few remaining user devices of the organization which would be able to join the local segment. Or, if very few user devices of the organization are in the local segment, it may be an indicator that users in the organization are generally uninterested in joining the local segment. In the example above where the local segment is associated with making purchases at a certain store, if most users in the organization already make purchases at the certain store, there may be very few remaining users in the organization that don't make purchases at that store. This may lead to few users that can join the local segment and a low reach index within the organization. Or, if very few users in the organization make purchases at the certain store, it may be an indicator that other users in the organization are unlikely to begin making purchases at the store (e.g., which may be based on similarities of users in the organization). Therefore, a small local segment in the organization may also correspond to a low reach index within the organization. Somewhere in between (e.g., where approximately half of the organization is in the target audience) may result in a strong potential reach within the organization to expand the number of users in the target audience or local segment. The analyzing user may use this information when determining whether to pursue expanding the target audience or not based on this reach potential. Generally, reach potential and reach index may be used interchangeably herein to describe an estimated likelihood that a user device becomes a member of a target audience or local segment.

When a device "joins" the local segment, that device may gain an attribute associated with the local segment. Using the example described above where the local segment makes purchases at a certain store, if the device is first not in the local segment, the device may not be associated with making purchases at the store. If the device becomes associated with making purchases at the store (e.g., based on a user of the device making a purchase at the store using the device, the device receiving a notice or receipt of a transaction at the store, etc.), then the device may take on the attribute of being associated with purchases at the store, and the device may join the local segment.

Identifying a device with a similar set of attributes to the devices in a target audience may provide benefits for converting the device into the target audience. For example, if the device is shown to exhibit attributes which would make it prone to converting to the target audience, that device may be treated as though it already is in the target audience for various purposes or operations (e.g., marketing, communications, etc.). In some cases, the device may be targeted for similar advertisements as the devices in the target audience. This may encourage the user of the device to behave in a way which converts the device into the target audience. For example, a device may have attributes similar to devices which shop at a particular store, although the device is not itself associated with purchases at the store. If the device is shown advertisements to the store similar to devices which already make purchases at the store, the user of the device may be prone to making purchases at the store based on viewing the advertisement.

Some conventional systems may focus on identifying the defining attributes of a data segment. However, because other user devices do not share the same set of attributes, analysis for conventional systems may be limited to just the identified data segment. An analyst in a conventional system may select which attributes to compare to user devices in the data segment, but selection of these attributes may be susceptible to human biases. For example, the analyst may completely miss analyzing an attribute with high similarity to their seed audience (e.g., the identified data segment) due to the analyst not expecting a similarity with the attribute (e.g., it may not be clear how data sets are created, some attributes may be named similarly without actually reporting similar data, etc.). These conventional systems may not support reach analysis outside of the identified data segment. As such, the conventional techniques may not provide the user with, in some cases, more meaningful results and analysis, as there may be significantly more potential user devices outside of the organization than within the organization.

In contrast, system 100 may include devices, systems, and subsystems that implement techniques to analyze a reach potential to expand a target audience inside or outside of an organization's population. The techniques described herein may support profiling the seed audience for each of a set of data provider attributes. In some cases, the techniques described herein may estimate the reach of a segment by comparing the similarity between the seed audience with the potential untapped devices for an attribute. For example, a database server in the cloud platform 115 may analyze data sets from a data provider in addition to the data set for the organization. By performing reach analysis using an external data set (e.g., from the data provider), the cloud platform 115 may provide more detailed reach potential analysis for a much larger set of users outside of the known data set of the organization. A data set received from the data provider may be associated with one or more features or attributes. When determining reach potential outside of the organization, the cloud platform 115 may consider how similar the organization population is to a data provider feature population, as well as how the local segment overlaps with the data provider feature population. The cloud platform 115 may determine which of the data provider feature populations have the greatest potential reach inside and/or outside of the organization. Similar to intra-organization analysis, if the local segment has, for example, too weak of an overlap with a data provider feature population, the reach potential for that data provider feature population may be low. The analysis for the reach potential outside of the organization may be displayed to the user on a user interface.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein.

However, the description and appended drawings only include example technical improvements resulting from implementing aspects of the disclosure, and accordingly do not represent all of the technical improvements provided within the scope of the claims.

Figure 2:
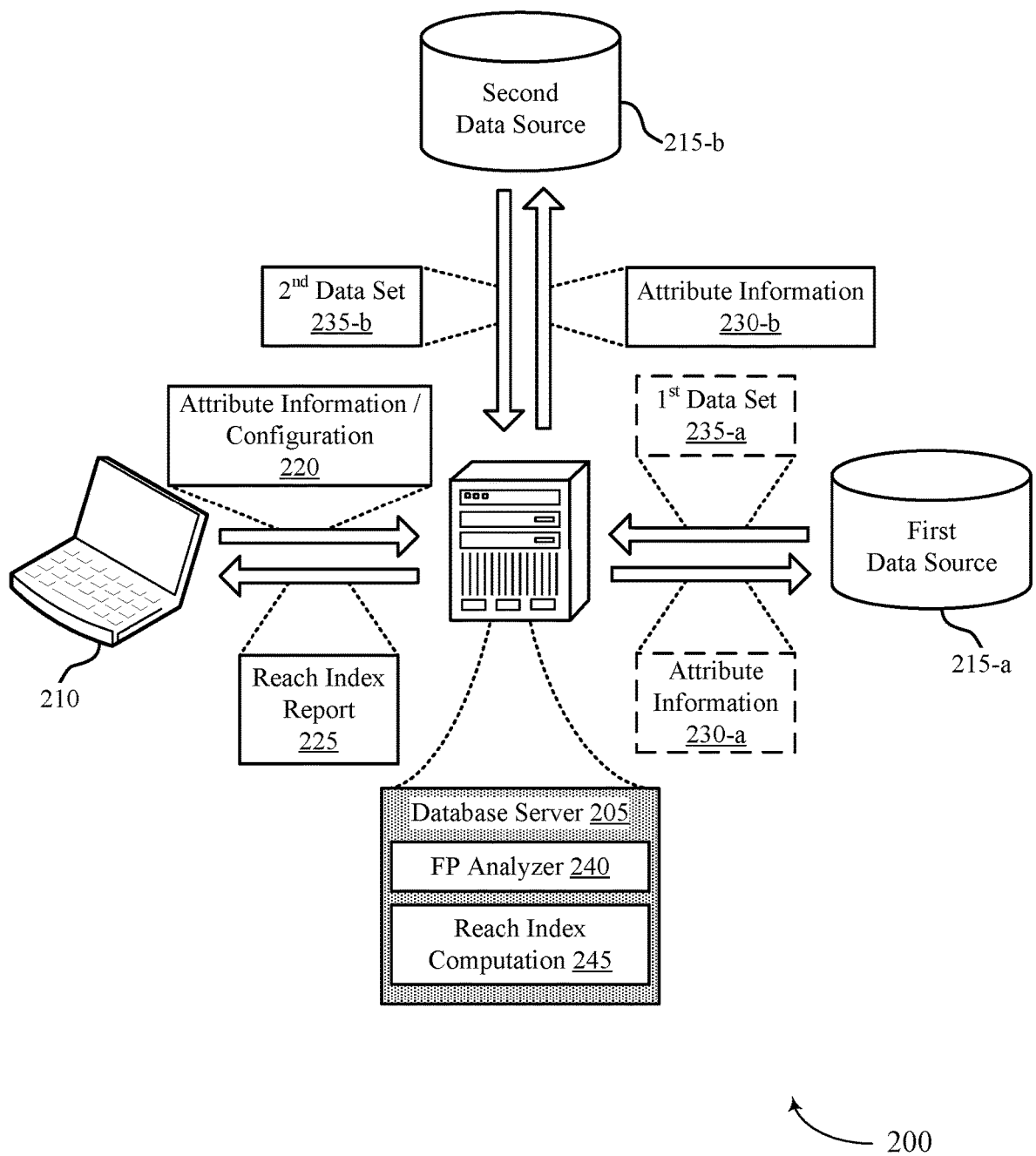
FIG. 2 illustrates an example of a subsystem that supports correlating user device attribute groups in accordance with aspects of the present disclosure.

FIG. 2 illustrates an example of a subsystem 200 that supports correlating user device attribute groups in accordance with aspects of the present disclosure. The subsystem 200 may include a database server 205, a device 210, a first data source 215-a, and a second data source 215-b. The device 210 may, in some cases, be an example of a client device, or user device, or a device corresponding to a tenant of a multi-tenant database. The database server 205 may provide aspects of the multi-tenant database. In some cases, the database server 205 may be an example of an application server, a server cluster, a virtual machine, a container, or the like. The database server 205 may provide services for the tenants of the multi-tenant database, for example through a cloud platform as described by the system 100 of FIG. 1. Some examples of these services may include FP analysis, reach index analysis, etc.

In some cases, an organization may be an example of a tenant of the multi-tenant database or a client of the cloud platform including the database server 205. An organization may include multiple users. For example, customers of the tenant or client may be included as users of the organization. Each user may be associated with one or more user devices, and data from properties of these devices or actions performed by these devices may be stored in the database server 205. As an example, a single individual may operate a laptop, mobile device, tablet, etc., and while each of these devices may correspond to a single individual, each of the devices may also be included in the user devices of the organization. In some cases, devices corresponding to a single user may be identified based on these devices sharing a same user identifier (ID) attribute or based on device graphing techniques. For example, in a deterministic cross device identity management (CDIM) scheme, devices may be grouped together if the devices share a same user ID attribute. In a predictive CDIM scheme, devices may be statistically grouped together using their data points. If two devices share common data points which suggest they are used by a common user, the predictive CDIM scheme may group the devices or, in some cases, may apply some percentage likelihood that these devices are used by a common user. In some cases, data, such as attributes, for each of these devices may be similar or the same based on the habits and information of the facilitator, but the devices may, in some cases, be tracked separately. In some cases, the database server 205 may collect data from the online properties of the user devices. In some other examples, an organization may provide information for its users to the database server 205. A data set may, in some cases, be referred to as a universe. Any device considered in the client's data set may exist within the client's universe. Any device which is not known by or tracked in the client's data set may be considered outside of that client's universe.

Each user device may have a set of attributes. Attributes may provide information about a user, such as gender identity, age, residency, etc. Additionally or alternatively, attributes may provide information about a user's activities, such as purchases made by the user, websites visited by the user, social media activities performed by the user, etc. In some cases, attributes may be referred to as features. In some cases, similar attributes may be grouped into a taxonomy. For example, a demographic taxonomy may include age, gender, and ethnicity attributes, among others. A segment or audience may be a group of users displaying a specific set of attribute values. For example, a client may create a segment of users age 25 to 30 based in London. In this example, the attribute values for this segment may include "age: 25 to 30" and "city: London." Other segments may be based on any number of other attributes and values of attributes. A seed audience, or a seed segment, may be a segment used for further analysis (e.g., a local segment or target audience as described herein). In some cases, for analyzing correlating user device attribute groups, the seed audience may be used to find users closely similar to those in another segment.

The database server 205 may perform reach analysis on a data set of an organization of a client. The client may be interested in growing a target audience within their organization. Reach analysis may enable the client to identify which attributes in other data sets highly index within the target audience in order to grow the reach and increase the size of the target audience. In some cases, an organization may be referred to as a base segment.

Some techniques and schemes for reach analysis described herein may utilize data provider attributes and data sets from an external source to perform reach analysis. In some cases, the database server 205 may perform reach analysis to expand the local segment within the client's organization, or the data base server 205 may perform reach analysis to expand the local segment outside of the client's organization. The database server 205 may incorporate one or more data sets from the data provider when performing reach index analysis within or outside of the client's organization.

In an example, the device 210 may transmit a request 220 including attribute information and indicators of a configuration for the reach analysis to the database server 205. The attribute information may include, for example, the local segment which the user of the device 210 (e.g., the client) is looking to expand. Additionally or alternatively, the attribute information may include one or more attributes which define the local segment. In some cases, the attribute information may correspond to a data provider to use for reach analysis. For example, the attribute information may indicate one or more data providers to retrieve feature populations from, the attributes which are used to retrieve the feature populations from the one or more data providers, etc. The configuration may indicate whether the database server 205 is requested to perform reach analysis within the organization, outside of the organization, or both. In some cases, the configuration may include a results configuration, which the database server 205 may use when generating a reach index report 225.

In some cases, the device 210 may provide a data set for the client directly to the database server 205. Or, in some other cases, the request 220 may include information which the database server 205 may use to request the data set for the client from a first data source 215. In an example, the database server 205 may transmit a request 230-a for a first data set (e.g., corresponding to the client) to the first data source 215-a. The request 230-a may include attribute information based on the attribute information provided by the device 210 in the request 220. The first data source 215-a may identify the first data set and transmit a response 235-a to the database server 205 including the first data set. The first data set may include information, such as attribute information, for user devices in the client's organization (e.g., first party data, second party data, etc.). Second party data may be an example of data provided or sold by other tenants (e.g., or clients) of the multi-tenant database. In some cases, an FP analyzer 240 of the database server 205 may perform FP analysis on the first data set. In some other examples, the database server 205 may have previously performed FP analysis on the first data set (e.g., prior to sending the first data set or updates for the first data set to the first data source 215-*a*).

The data provider attributes may be stored in an external database such as a second data source 215-*b*. In some examples, both the client data (e.g., the first data set) and the data provider data (e.g., a second data set) may be stored in a same data source 215. Additionally or alternatively, the first data set, the second data set, or both may be stored across multiple data sources 215 and may be managed by one or more clients or organizations. The second data set may, in some cases, be referred to as a data provider attribute population or segment, a data provider feature population or segment, an external data set, a third party data set, etc. The data provider attributes may be associated with a data set of user devices received from the data provider. Each user device in the second data set from the data provider may be associated with a particular attribute or set of attributes. For example, a first data provider attribute population may include user devices which (e.g., according to an attribute value of these user devices) are associated with residence in Berlin. Another data provider attribute population may correspond to a set of user devices which are women over the age of 50. The database server 205 may transmit a request 230-*b* to the second data source 215-*b* and receive a response 235-*b* including the second data set. The database server 205 may receive data provider feature populations with relatively large populations (e.g., hundreds, thousands, millions, etc.) of untapped devices and high similarity to the seed audience (e.g., the local segment). The database server 205 may store the second data set in such a way that the data provider may deprovision the second data set from the client (e.g., based on the client ending a subscription or agreement with the data provider). The request 230-*b* may include attribute information based on the request 220 received from the device 210.

The first data set and the second data set may, in some cases, have common, or overlapping, user devices. For example, a user device in the first data set may also be included in the second data set. In some cases, reach potential analysis or reach index computation may be based on analyzing the overlaps between the data sets. As described herein, an "overlap" may refer to an intersection of at least two data sets or data subsets, where the overlap includes user devices that share attribute(s) which define the at least two data sets. For example, an overlap between the first data set and the second data set may include devices which are both in the client's organization and are in the data provider's population having the attribute which defines the second data set. In a non-limiting example, if a local segment of the client's organization being analyzed includes user devices which have an attribute of "location: Chicago," and the second data set includes user devices from the data provider which have an attribute of "age: 50+," then the overlap between the local segment and the second data set may include user devices which are in the client's organization, are in the data provider's universe, have the attribute "location: Chicago," and have the attribute "age: 50+". In other examples, other attributes or data sets may be used.

The client may request for the database server 205 to perform reach analysis to extend reach of the local segment either within the organization or outside of the organization. Reach potential analysis within the client's universe may help the client find their own user devices that share common attribute values as observed by the data provider's universe and are similar to the local segment. Reach potential analysis beyond the client's universe (e.g., extension segments) may target other users not from the client's universe, but which share similar attribute values to the local segment. In some examples, instead of the overlap index, the database server 205 may use a Jaccard index, J, to compare the similarity between finite sample sets. The Jaccard index may be defined as the size of the intersection divided by the size of the union of the sample sets, shown by Equation 1 below.

$$J(A, B) = \frac{|A \cap B|}{|A \cup B|} = \frac{|A \cap B|}{|A| + |B| + |A \cap B|} \quad (1)$$

In some cases, the client (e.g., through the device 210) may request for the database server 205 to perform reach analysis to extend reach only within the client's universe. The database server 205 may perform reach analysis to find users within the client's data set that share common attribute values based on observations made using the external data provider's universe, which may not be observed just by analyzing the client's universe. For example, the external data provider's data set, when analyzed, may reveal additional information about how the client can increase the target audience within their own organization, which analysis using the client's data set could not provide. Analyzing the reach potential within the organization may indicate a likelihood that users not in the local segment, but in the overlap between the organization and the data provider feature population, could convert to be a part of the local segment.

To perform reach index analysis within the organization, the reach index computation component 245 may take a Jaccard index of a local segment, L, and an intersection between the first data set corresponding to the organization, Org, and the second data set corresponding to the data provider feature population, F. Therefore, the reach index computation component 245 may calculate a first Jaccard index shown by Equation 2.

$$J(L, F \cap Org) = \frac{|L \cap F(\cap Org)|}{|L| + |F \cap Org| - |L \cap (F \cap Org)|} \quad (2)$$

As the local segment is a subset of the reference population (e.g., the first data set), the Jaccard index of the two may always be greater than 0. The Jaccard index for potential within the organization may be based on how similar the local segment is to the data provider feature population.

The relationship between overlap and reach may have a similar shape to the binary entropy of information function. Therefore, the database server 205 may apply the binary entropy of information function to J(L, F∩Org)) when computing the reach potential within the organization, shown by Equation 3.

$$\text{Reach Potential Inside } Org = H(J(L, F \cap Org)) = \quad (3)$$
$$-J_{LFOrg} \log_2 J_{LFOrg} - (1 - J_{LFOrg}) \log_2 (1 - J_{LFOrg})$$
$$\text{where } 0 \log_2 0 := 0 \text{ and } J(L, F \cap Org) = J_{LFOrg}$$

In some examples, the client (e.g., through the device 210) may request the database server 205 to perform reach index analysis outside of the organization. In some examples, there may be significantly more untapped devices outside of the organization than within the organization. Therefore, by analyzing reach potential outside of the organization, the client may determine a larger number of user devices which may be likely to join the local segment or target audience within the first data set.

To determine reach potential outside of the organization, the database server 205 may apply the binary entropy of information function to J(F, Org) when computing the reach potential outside of the organization. The Jaccard index of F and Org may be shown by Equation 4. Applying the binary entropy of information function may be shown by Equation 5.

$$J(F, Org) = \frac{|F \cap Org|}{|F| + |Org| - |F \cap Org|} \quad (4)$$

$$H(J_{FOrg}) = -J_{FOrg} \log_2 J_{FOrg} - (1 - J_{FOrg}) \log_2 (1 - J_{FOrg}) \quad (5)$$

where $0 \log_2 0 := 0$ and $J(F, Org) = J_{FOrg}$

The potential reach outside of the organization may take into account how similar the organization population is to the data provider feature population, as well as how the local segment overlaps with the feature population. There may be a strong overlap between the first data set and the second data set, but the local segment does not overlap with the feature population at all. In this case, the potential reach outside the organization would be 0. The relationship between the overlap of the local segment with the feature population and potential reach outside the organization may be, or may approximately be, linear. The greater the overlap, the greater the reach given the overlap between the organization and the feature is constant and greater than 0. Therefore, the similarity of the local segment with the feature may be accounted for in calculating the reach potential outside of the organization. For example, a ratio between the two may be applied, such that the reach potential outside of the organization is determined based on Equation 6.

$$\text{Reach Potential Outside } Org = H(J(F, Org)) * \frac{L \cap F}{F \cap Org} \quad (6)$$

The database server 205 may perform reach index computation 245, inside or outside of the organization, using multiple different data sets from the second data source 215-b. The data provider may provide multiple data sets based on different data provider attributes. The database server 205 may generate a reach index report 225 based on analyzing multiple different data provider attributes. The database server 205 may include the data provider attributes with the strongest reach potential in the reach index report 225. In some cases, the database server 205 may perform analysis for multiple data provider attributes and rank the reach indexes of the multiple data provider attributes. The ranking may be included in the reach index report 225. In some examples, the reach index report 225 may include a number of untapped devices per data provider attribute (e.g., untapped devices inside the organization, outside of the organization, or both). The reach index report 225 may include an overlap index based on the local segment, the organization's data set, and the data set for each data provider attribute included in the report.

In some cases, the reference population (e.g., the client's population, or the set of devices in the organization) may be restricted to a time restriction. For example, if a device has been active or has had activity recorded by the organization within the time restriction, that device may be considered valid. In some examples, only devices which are valid within the time restriction may be included in the local segment. Therefore, if a device has been inactive for longer than the time restriction, but the device has an attribute value associated with the local segment, that device may still not be included in the local segment when determining reach potential. In some cases, this may enable the database server 205 to calculate, and a client to receive, up-to-date information for reach potential. In some cases, the time restriction may be configurable. In some examples, the database server 205 may be configured to determine reach potentials for various different time restrictions, which may provide information as to whether the local segment has increased in size or decreased over a time period. As an example, the time restriction may be 30 days or a month. In this example, any device not active in the organization within the last month may not be included in the local segment, the reference population, or both.

A number of results provided in the reach index report 225 may be based on information (e.g., configuration information) included in the request 220 received from the device 210. In some cases, the device 210 may include a request to perform reach analysis for specific data provider attributes. Additionally, or alternatively, the database server 205 may perform reach potential analysis for a large number of data provider feature populations and include only the features with the highest reach potential indexes in the reach index report 225. In some cases, the report, or any rankings included in the report, may consider reach index values, a number of untapped devices, or any other factor. For example, a feature group population with a slightly lower reach index but significantly more untapped devices may rank higher than a feature group population with a slightly higher reach index but significantly fewer untapped devices. In some cases, the attributes in the reach index report 225 may be categorized based on tiers. For example, data provider attributes which provide a strong reach index may be categorized into a "high" tier. There may also be "medium" and "low" tiers. In other examples, other forms of rankings or tiering may be used.

After performing the reach index analysis, the reach index report 225 (e.g., a segment level reach report) may be sent to the device 210. The contents of the reach index report 225 may be displayed on a user interface of the device 210. An example of a user interface and reach index report 225 is described in more detail in FIG. 5. The client may then use the information included in the reach potential report 225 to determine how to convert the untapped devices into the local segment or how to address both the devices in the local segment and the identified untapped devices similar to the devices in the local segment.

Figure 3:
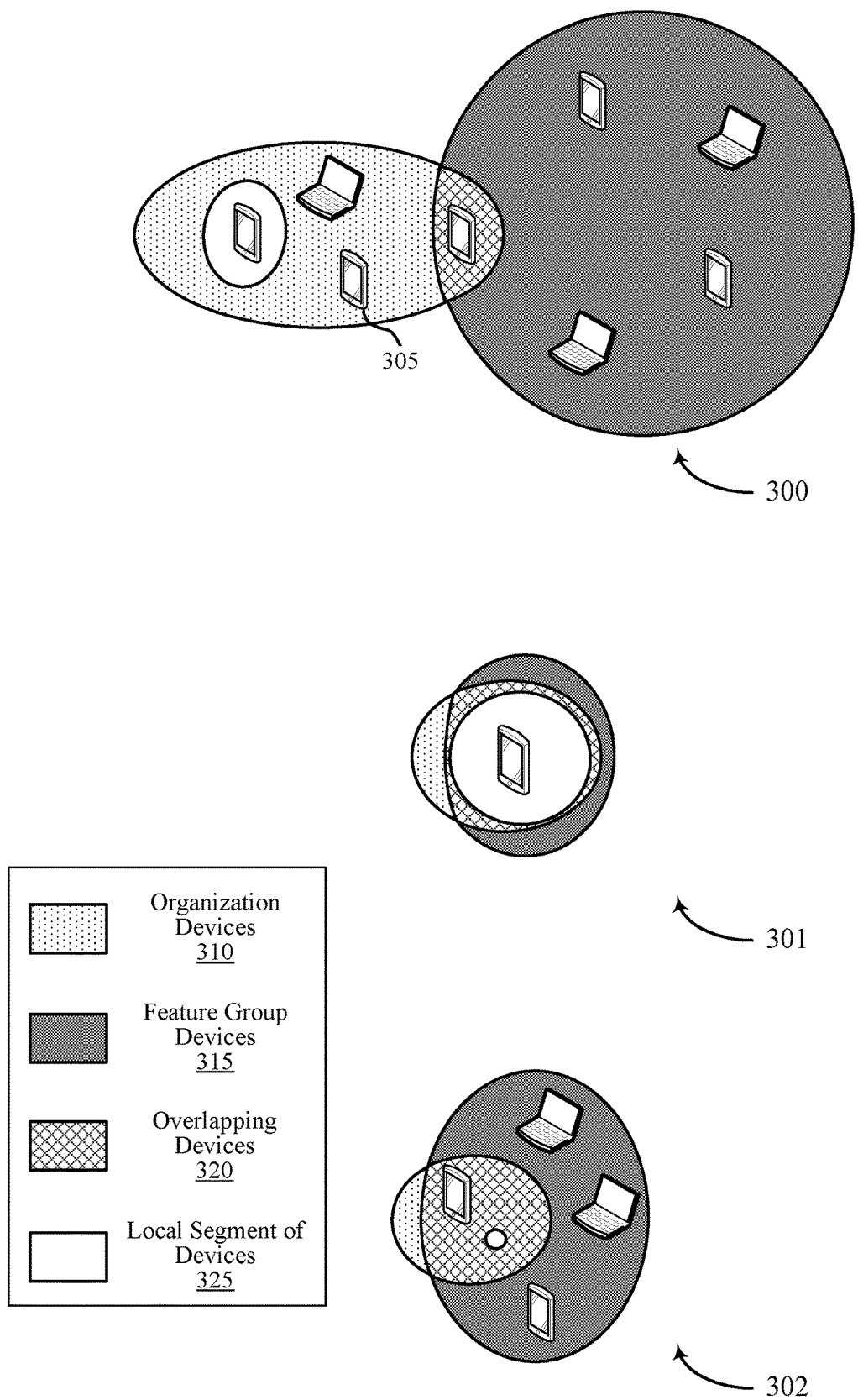
FIGS. 3 and 4 illustrate examples of overlapping device groups that support correlating user device attribute groups in accordance with aspects of the present disclosure.

FIG. 3 illustrates an example of overlapping device groups 300 that support correlating user device attribute groups in accordance with aspects of the present disclosure. As described herein, a database server may perform reach index analysis on two or more data sets to determine a likelihood of a target audience in one data set growing based on a second data set from a data provider defined by a particular attribute. A user device 305 shown in the overlapping device groups 300, 301, and 302 may represent one or more devices, as the devices 305 may be shown for simplicity. Generally, the larger the area of an element (e.g., organization devices 310, feature group devices 315, overlapping devices 320, and local segment of devices 325) in the overlapping device groups 300, 301, or 302, the more user devices 305 belong to that set or subset.

A first data set of organization devices 310 may include user devices 305 which belong to an organization (e.g., the organization stores data, such as CRM data, for these user devices 305). The organization devices 310 may include one or more devices 305 per user (e.g., per person), which may be tracked based on a user ID attribute of the devices 305. The organization devices 310 may include devices 305 used by customers or members of the organization. In some cases, the organization may be referred to as a client, where the organization may be a client or tenant of the database server providing the reach index analysis.

A second data set of feature group devices 315 may include user devices 305 which are in the records of a data provider and have a particular attribute value (e.g., a particular feature or set of features). For example, a data provider may have information for a large set of user devices 305 from various sources (e.g., customers, clients, partners, purchased or acquired data, etc.). In some cases, the data provider may send multiple data sets to the database server, where each of the multiple data sets is based on a particular data provider feature population. Or, in some cases, the data provider may send one large data set to the database server including a large number of user devices which have various attribute values, and the database server may separate the large data set into smaller sets based on data provider attribute values.

The first data set of organization devices 310 and the second set of feature group devices 315 may have some overlap. For example, there may be common devices in the organization devices 310 and the feature group devices 315. The database server may identify this overlap based on internet protocol (IP) address information, user IDs, user device IDs, etc. for the devices. In some cases, user devices 305 in the overlapping devices 320 may be tracked by both the organization and the data provider based on sharing a common user ID at the device level.

A client corresponding to the organization may use data provider attributes in a reach index analysis scheme to determine reach potential within or beyond their own data set's universe. The client may be interested in growing a local segment of devices 325. The local segment of devices 325 may be an example of a target audience of devices which are in the organization devices 310. Each device 305 in the local segment of devices may have a particular attribute (e.g., feature or set of features) which defines the target audience and may be included in the organization devices 310. The database server may incorporate the feature group devices 315 when performing reach index analysis to determine the reach potential of the local segment of devices 325 within the organization devices 310 or outside of the organization devices 310 (e.g., and in the feature group devices 315).

The overlapping device groups 300, 301, and 302 may provide examples of data sets with weak overlaps that do not provide a high reach potential for the local segment of devices 325. For example, in the overlapping device groups 300, the organization devices 310 may have a weak overlap with the feature group devices 315. The local segment of devices 325 does not overlap with the feature group devices 315 at all, so there may be very little or no similarity between the local segment of devices 325 and the feature group devices 315. If targeted, the users in the feature group devices 315 may be less likely to convert to become part of the local segment of devices 325. Therefore, there may be a low reach inside of the organization and a low reach outside of the organization.

For the overlapping device groups 301, the organization devices 310 may have a strong overlap with the feature group devices 315. All or most of the user devices 305 in the local segment of devices 325 may also be in the feature group devices 315. However, there may not be many users left in the feature group devices 315 to add to the local segment of devices 325. Therefore, there may be low reach inside the organization and low reach outside of the organization.

For the overlapping device groups 302, the organization devices 310 may have a strong overlap with the feature group devices 315, and all or most of the user devices 305 in the local segment of devices 325 may also be in the feature group devices 315. However, the user devices 305 in the feature group devices 315 may be a small fraction of the feature group devices 315, so there may be high dissimilarity between the local segment of devices 325 and the feature group devices 315. Therefore, there may be low reach inside the organization and low reach outside of the organization.

Figure 4:
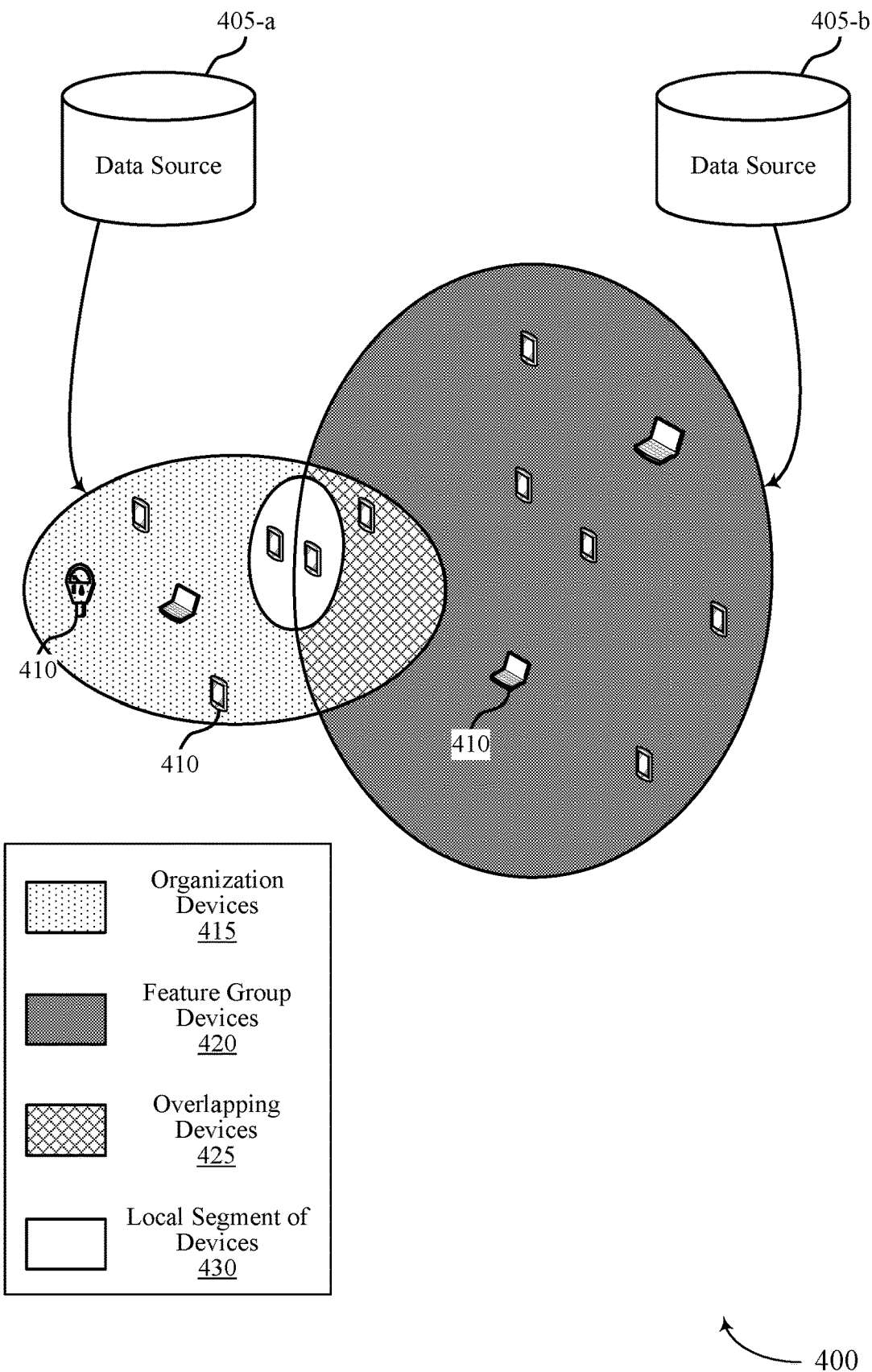

FIG. 4 illustrates an example of overlapping device groups 400 that supports correlating user device attribute groups in accordance with aspects of the present disclosure. The overlapping device groups 400 may include a first set of organization devices 415, a second set of feature group devices 420, a subset of overlapping devices 425, and a local segment of devices 425. These may be examples of the organization devices 310, feature group devices 315, overlapping devices 320, and local segment of devices 325 as described with reference to FIG. 3. A database server performing reach index analysis may retrieve the first data set of the organization devices 415 from a first data source 405-a and retrieve the second data set of the feature group devices 420 from a second data source 405-b.

The overlapping device groups 400 may show an example of device groups where the local segment of devices 430 has a high reach potential within and outside of the organization devices 415 based on the attributes of the feature group devices 420. Slightly under half of the organization devices 415 overlap with the feature group devices 420, and about half of the local segment of devices 430 overlap with the feature group devices 420. The relationship between overlap and reach may have a similar shape to the binary entropy of information function, such that the maximum reach potential occurs when a Jaccard index of two finite sets of user devices 305 is at approximately 0.5, or where half of a first set and half of a second set overlap. As such, this may result in a strong reach potential for the local segment of devices 430 within the organization devices 415 and a strong reach potential outside of the organization devices 415 (e.g., and in the feature group devices 420). This may be an indicator to the client associated with the organization that many user devices 410 in the organization and outside of the organization which display the attribute associated with the feature group devices 420 would be likely to convert to the local segment of devices 430 or behave similarly to the devices in the local segment of devices 430.

A client (e.g., using a device) may request a database server to perform the reach index analysis and generate a reach index report based on the analysis. The reach index report may include a number of untapped devices within the organization devices 415, a number of untapped devices in the feature group devices 420, or both. In some cases, the reach index report may include reach index values for the reach within the organization, the reach outside the organization, or both. The database server may perform reach index analysis for multiple different sets of feature group devices 415, where each of the different sets of feature group devices corresponds to a different data provider feature population. The different sets of feature group devices may, in some cases, have common devices. The database server may rank the data provider feature populations to determine which data provider feature populations result in the highest reach potentials. The database server may compile the data provider feature populations with the highest reach indexes into the reach index report and transmit the reach index report to a device associated with the client. The reach index report may be displayed on a user interface at the device.

Figure 5:
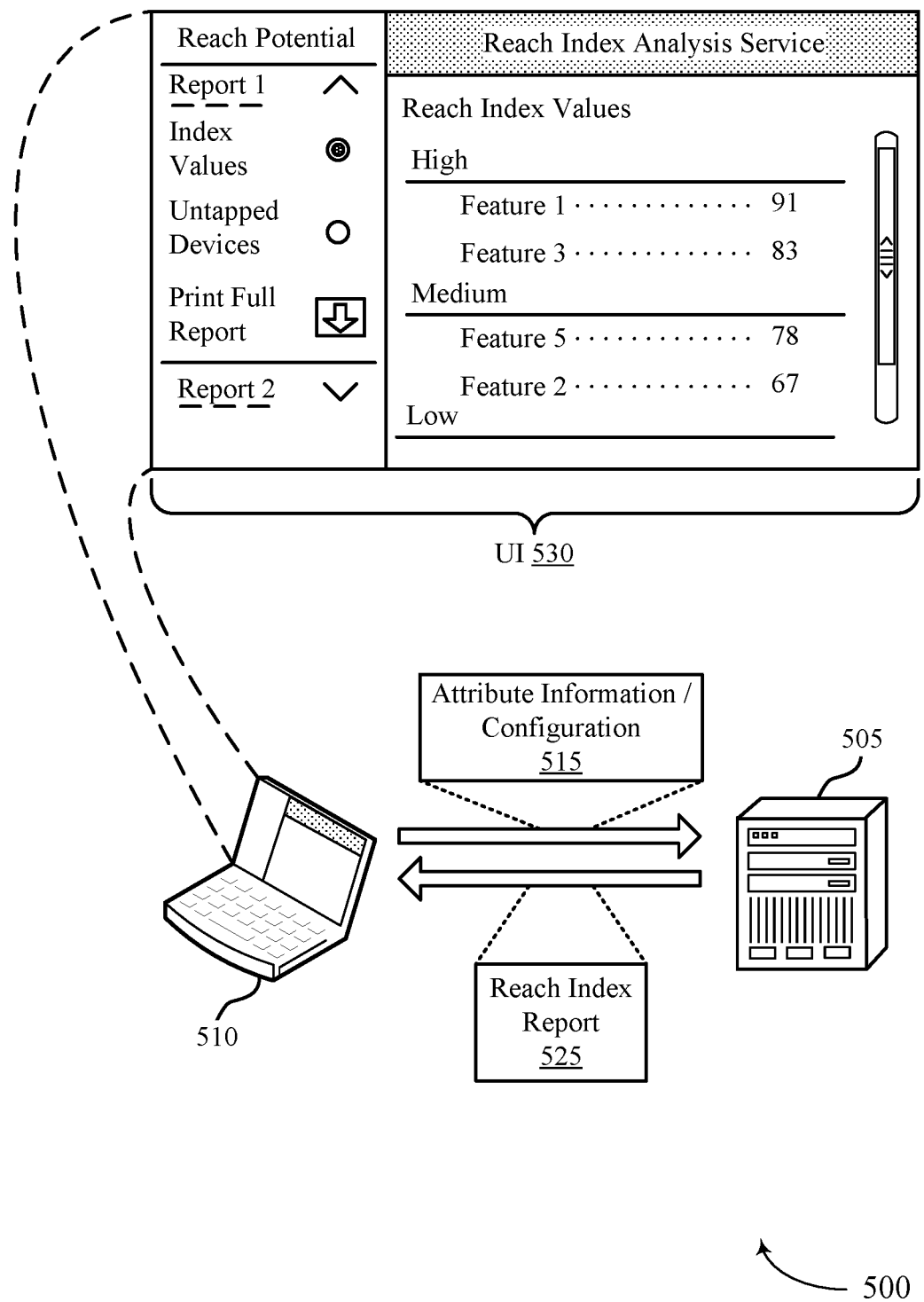
FIG. 5 illustrates an example of a reach index report display that supports correlating user device attribute groups in accordance with aspects of the present disclosure.

FIG. 5 illustrates an example of a reach index report display 500 that supports correlating user device attribute groups in accordance with aspects of the present disclosure. As described herein, a client or tenant of a database server 505 may use a device 510 to transmit a request 515 for the database server 505 to perform reach analysis for a set of user devices associated with the client's organization. The device 510 may generate the request 515 based on user input to the user interface 530. The request 515 may include different attribute information or configuration information (e.g., input by the user) which the database server 505 uses to perform the reach potential analysis and generate the reach index report. The database server 505 may retrieve a data set of user devices associated with the organization and retrieve multiple data sets associated with different attributes from a data provider. The database server 505 may perform reach index analysis for the different data provider attributes and generate a ranking of the different data provider attributes based on the calculated reach indexes. The database server 505 may then generate a reach index report 525 based on the analysis and transmit the reach index report 525 to the device 510.

In some cases, some contents of the reach index report 525 may be displayed on a user interface 530 of the device 510. The user interface 530 may display, for example, an interactable display of the contents of the reach index report 525. A user operating the device 510 may be able to look at different results of different data provider feature populations, including one or more of reach index values, overlap indexes, a number of untapped devices within the organization devices, and a number of untapped devices outside of the organization devices. The user interface 530 may display information for the data provider feature populations with the highest reach indexes. In some cases, the data provider feature populations may be separated into different tiers (e.g., a "high" tier, "medium" tier, and "low" tier) based on static or dynamic reach potential thresholds. In the illustrated example of a first report, a first feature (Feature 1) and a third feature (Feature 3) may result in the highest reach potentials for the data set of user devices of the client's organization.

In some cases, the user interface 530 may provide a link, button, or otherwise interactable object for downloading a full report of the reach index report 525. In some cases, the user interface 530 may display what may be considered the most meaningful information to the client or the user of the device 510, where a full or more comprehensive data report may be downloadable through an interactable object on the user interface 530. In some cases, the full report may be downloaded as a text file, a Portable Document File (PDF), or some other file or file format. It is to be understood that the user interface 530 illustrated in FIG. 5 is one possible example of a user interface that supports correlating user device attribute groups, and any number of additional or alternative user interfaces may be implemented within the scope of the present disclosure.

Figure 6:
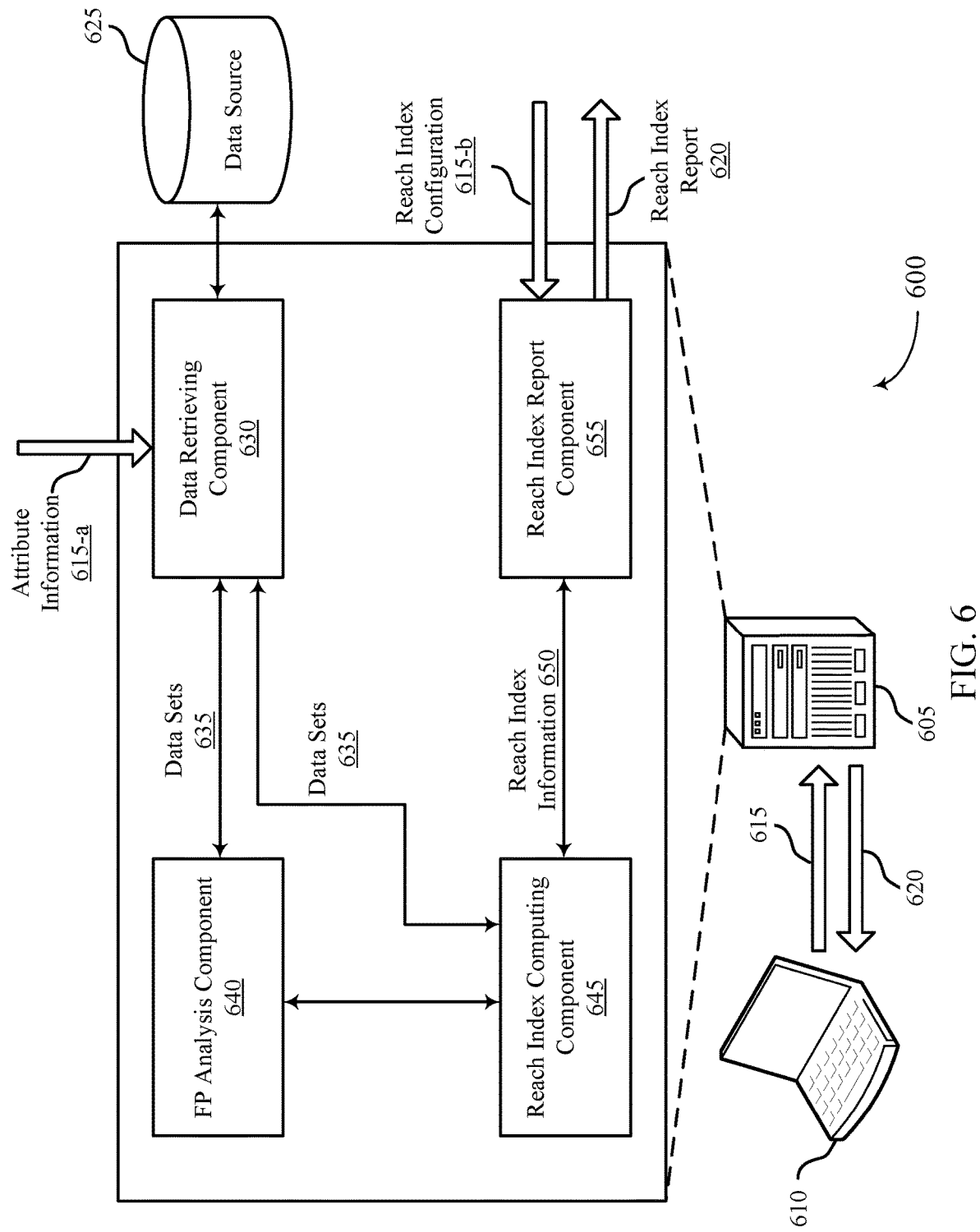
FIG. 6 illustrates an example of a reach index analysis operation that supports correlating user device attribute groups in accordance with aspects of the present disclosure.

FIG. 6 illustrates an example of a reach index analysis operation 600 that supports correlating user device attribute groups in accordance with aspects of the present disclosure. The reach index analysis operation 600 may include a database server 605 and a device 610. The database server may be an example of a database server 205 as described with reference to FIG. 2, and the device 610 may be an example of a device 210 as described with reference to FIG. 2.

As described herein, the device 610 may transmit a request 615 to the database server 610. The request 615 may include attribute information, indicators of a reach index configuration, or both. The request 615 may request for the database server 605 to perform reach index analysis for a first data set of user devices corresponding to a client's organization.

The database server 605 may receive attribute information 615-*a*, included in the request 615, at a data retrieving component 630. The attribute information may include information related to the client's organization. The data retrieving component 630 may retrieve, from a data source 625, the first data set of user devices for the client's organization. The data retrieving component 630 may also retrieve a second data set of user devices from a data provider. The retrieved data sets may include a subset of stored information for the user devices (e.g., information relevant to the reach analysis, such as numbers of devices, device IDs, etc.). The database server 605 may perform reach index analysis for multiple different data sets corresponding to multiple different data provider attributes. In some cases, the data retrieving component 630 may retrieve multiple different data provider data sets, or the data retrieving component 630 may retrieve one large data provider data set (e.g., using a single retrieval process or a batch retrieval process) and organize the large data provider data set into multiple, smaller data provider data sets based on different attributes. In some cases, the first data set and the second data set may be retrieved from the same data source. In other examples, the first data set may be retrieved from a first data source, and the second data set may be retrieved from a second, different data source. In some examples, the database server 605 may receive the first data set (e.g., for the client's organization) directly from the device 610.

In some cases, the data retrieving component 630 may send the first data set, the second data set, or both, to an FP analysis component 640. The FP analysis component 640 may perform FP analysis on the data sets, which may provide insight into patterns and correlations between different subsets of the data based on features, attributes, or sources of the data. In some cases, the FP analysis may be applied in the reach index analysis. For example, the FP analysis may determine one or more features to analyze from the data provider data sets.

The reach index computing component 645 may receive the data sets 635 from the FP analysis component, the data retrieving component 630, or both. The reach index computing component 645 may calculate, for a local segment, a reach index within the organization or a reach index outside of the organization. The reach index computing component 645 may determine the different reach index values as described in FIG. 2. The reach potential within the organization may indicate the likelihood of converting, to the target audience, user devices in the organization that share common attribute values as observed by the data provider universe. The reach potential outside of the organization may indicate the likelihood of converting, to the target audience, user devices not in the organization that share common attribute values as observed by the data provider universe. The reach index computing component may send reach index information to a reach index report component.

The reach index report component 655 may use a reach index configuration 615-*b*, transmitted as part of the request 615, to generate a reach index report 620. In some cases, the reach index report component 655 may rank the reach indexes calculated by the reach index computing component 645 and include a certain number of ranked data provider attributes in the reach index report 620. The reach index report component 655 may include, for example, a number of untapped devices for each data provider attribute, an overlap index, a reach index value, etc. The reach index report component 655 may generate the reach index report 620, and the database server 605 may transmit the reach index report 620 to the device 610.

Figure 7:
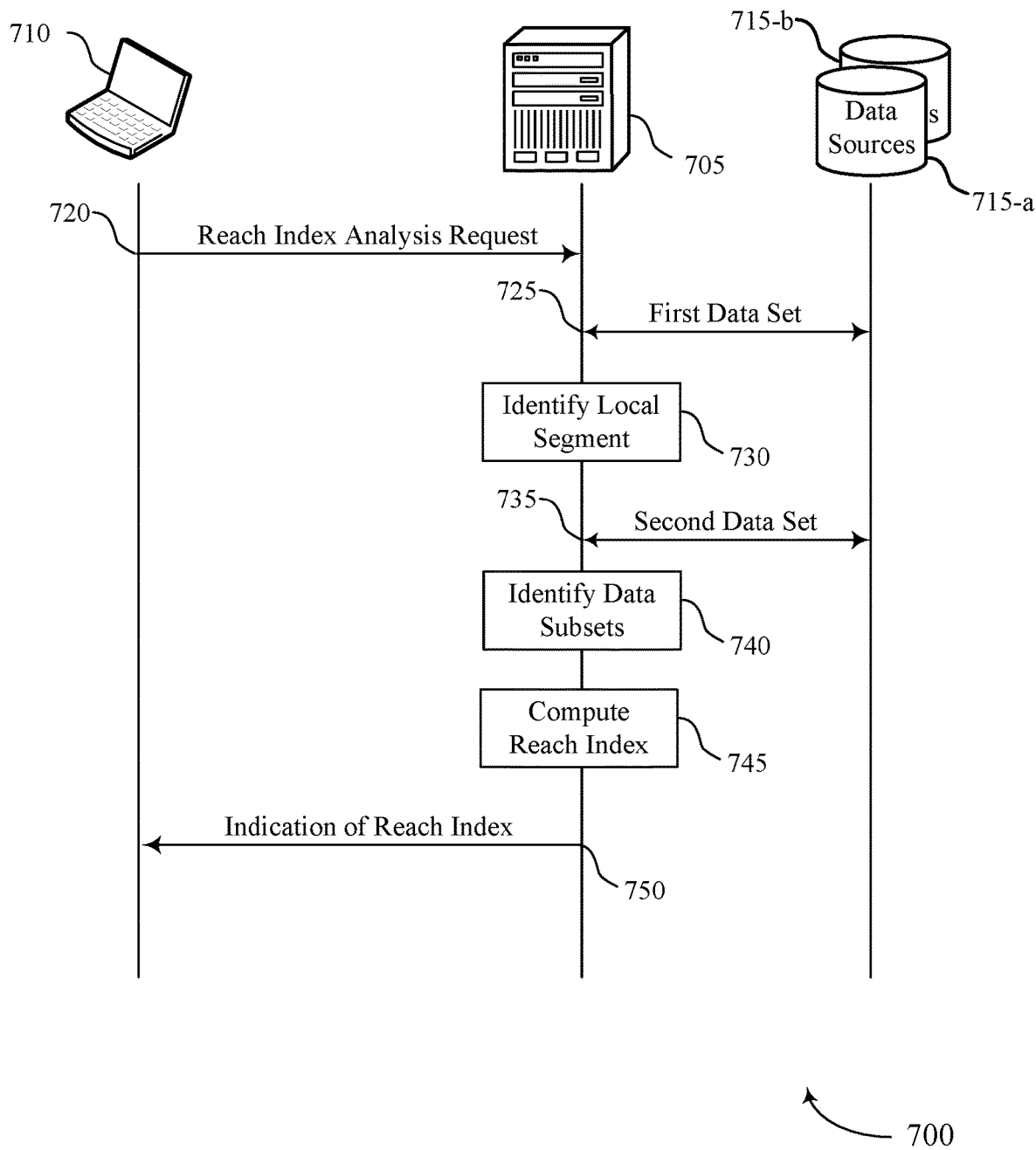
FIG. 7 illustrates an example of a process flow that supports correlating user device attribute groups in accordance with aspects of the present disclosure.

FIG. 7 illustrates an example of a process flow 700 that supports correlating user device attribute groups in accordance with aspects of the present disclosure. The process flow 700 includes a database server 705, a device 710, and a data source 715 which may be respective examples of a database server 205, a device 210, and a data source 215 described with reference to FIG. 2. The device 710 may be associated with or operated by a client. The client may be associated with an organization that includes (or stores information related to) multiple user devices. In some cases, the device 710 may be an example of a tenant of a multi-tenant database. In some examples, the database server 705 may be an example or component of the multi-tenant database. Alternative examples of the following may be implemented, where some steps are performed in a different order than described or are not performed at all. In some cases, steps may include additional features not mentioned below, or further steps may be added.

At 720, the device 710 may transmit a request to the database server 705 for reach index analysis. In some cases, the device 710 may indicate a first data set for a first set of user devices. At 725, the database server 705 may receive, from a first data source 715-*a*, the first data set for the first set of user devices. The first data set for the first set of user devices may correspond to the organization devices as described with reference to FIGS. 3 and 4.

The database server 705 may identify, within the first set of user devices, a first subset of user devices characterized by a first set of attributes (e.g., a feature or a set of features). The first subset of user devices characterized by a first set of attributes may correspond to a local segment of devices as described herein. The first subset of user devices may be an example of a target audience which the client is interested in growing. In some cases, the database server 705 may receive, from the device 710, an indicator for the first set of attributes, where the first subset of user devices is based on receiving the indicator from the device 710.

Database server 705 may receive, from a second data source 715-*b* (e.g., different from the first data source 715-*a*) a second data set for a second set of user devices characterized by a second set of attributes. In some cases, the first and second data sources may correspond to different organizations, access levels, subscriptions, etc. for a same database or database system. The second data set for the second set of user devices characterized by the second set of attributes may be an example of a data provider feature population or the feature group devices described with reference to FIGS. 3 and 4.

In a first example, the database server 705 may compute a reach index outside of the organization (e.g., outside of the first data set received from the first data source). In this example, at 740, the database server 705 may identify a second subset of user devices that belong to the first subset of user devices and the second set of user devices, and the database server 705 may identify a third subset of user devices that belong to the first set of user devices and the second set of user devices. In this example, the second subset of user devices may correspond to user devices which are in both the local segment of devices and the feature group devices described with reference to FIGS. 3 and 4. The third subset of user devices may correspond to devices in the overlapping devices described with reference to FIGS. 3 and 4.

At 745, the database server 705 may compute a reach index outside of the first data set received from the first data source based on a first ratio of a first number of user devices in the third subset to a second number of user devices in the first set of user devices or the second set of user devices but not the third subset of user devices and based at least in part on a second ratio of a third number of user devices in the second subset of user devices to the first number of user devices in the third subset. For example, the database server 705 may take a Jaccard index of the first data set (e.g., the organization devices) and the second data set (e.g., the data provider feature devices), resulting in J(F, Org). The database server 705 may apply the binary entropy of information function to the calculated Jaccard index and may apply a ratio which captures the similarity of the local segment with the feature by their ratio, $$\frac{L \cap F}{F \cap Org}$$

(e.g., the second ratio). Therefore, the reach index outside of the first data set is equal to $$H(J(F, Org)) * \frac{L \cap F}{F \cap Org}.$$

At 750, database server 705 may transmit, to device 710, an indication of the reach index outside of the first data set.

In a second example, the database server 705 may compute a reach index within the organization (e.g., within the first data set received from the first data source). In this example, at 740, the database server 705 may identify a second subset of user devices that belong to the first subset of user devices and the second set of user devices, and the database server 705 may identify a third subset of user devices that belong to the first subset or an intersection of the first data set and the second data set but not the second subset of user devices. In this example, the second subset of user devices may correspond to user devices which are in both the local segment and the feature group devices described with reference to FIGS. 3 and 4. The third subset of user devices may correspond to user devices either in the local segment of devices or the overlapping devices, but not both the local segment and the overlapping devices as described with reference to FIGS. 3 and 4.

At 745, the database server 705 may compute a reach index within the first data set received from the first data source based a ratio of a first number of user devices in the second subset to a second number of user devices in the third subset. For example, the database server 705 may take a Jaccard index of the first subset (e.g., the local segment) and the intersection of the first set and the second set (e.g., an overlapping set of devices which are in both the organization devices and the data provider feature devices), resulting in J(L, F∩Org). The database server 705 may apply the binary entropy of information function to the calculated Jaccard index. Therefore, the reach index within the first data set is equal to H(J(L, F∩Org)). At 750, the database server 705 may transmit, to device 710, an indication of the reach index within the first data set.

The database server 705 may calculate multiple reach indexes for multiple different sets of devices corresponding to different data provider attributes. In some cases, the database server 705 may rank the reach indexes, where transmitting the indication of the reach index is based on the ranking. In some cases, the reach index may be transmitted as part of a reach index report, which may be displayed on a user interface at the device 710.

Figure 8:
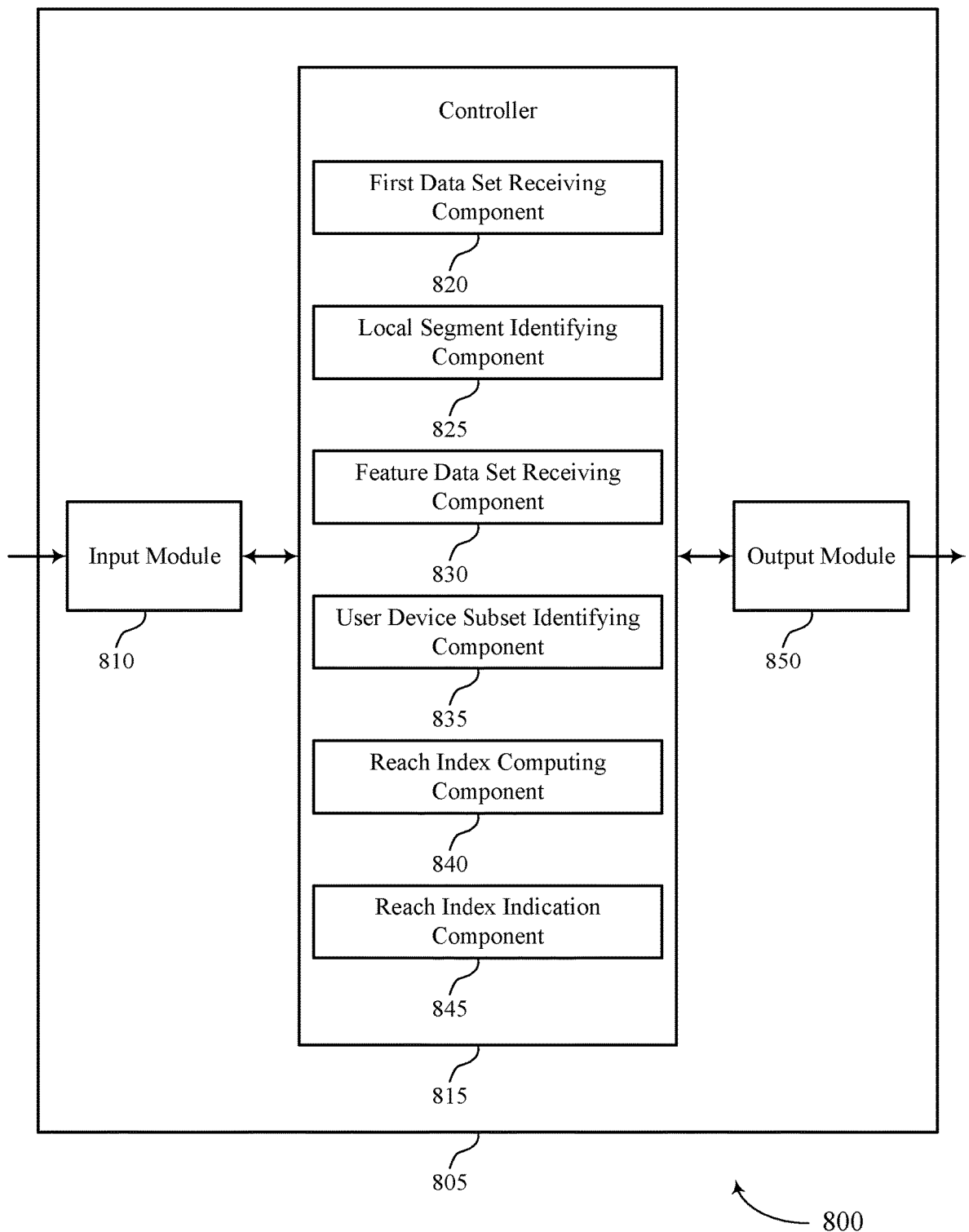
FIG. 8 shows a block diagram of an apparatus that supports correlating user device attribute groups in accordance with aspects of the present disclosure.

FIG. 8 shows a block diagram 800 of an apparatus 805 that supports correlating user device attribute groups in accordance with aspects of the present disclosure. The apparatus 805 may include an input module 810, a controller 815, and an output module 850. The apparatus 805 may also include a processor. Each of these components may be in communication with one another (e.g., via one or more buses). In some cases, the apparatus 805 may be an example of a user terminal, a database server, or a system containing multiple computing devices.

The input module 810 may manage input signals for the apparatus 805. For example, the input module 810 may identify input signals based on an interaction with a modem, a keyboard, a mouse, a touchscreen, or a similar device. These input signals may be associated with user input or processing at other components or devices. In some cases, the input module 810 may utilize an operating system such as iOS®, ANDROID®, MS-DOS®, MS-WINDOWS®, OS/2®, UNIX®, LINUX®, or another known operating system to handle input signals. The input module 810 may send aspects of these input signals to other components of the apparatus 805 for processing. For example, the input module 810 may transmit input signals to the controller 815 to support correlating user device attribute groups. In some cases, the input module 810 may be a component of an input/output (I/O) controller 1015 as described with reference to FIG. 10.

The controller 815 may include a first data set receiving component 820, a local segment identifying component 825, a feature data set receiving component 830, a user device subset identifying component 835, a reach index computing component 840, and a reach index indication component 845. The controller 815 may be an example of aspects of the controller 905 or 1010 described with reference to FIGS. 9 and 10.

The controller 815 and/or at least some of its various sub-components may be implemented in hardware, software executed by a processor, firmware, or any combination thereof. If implemented in software executed by a processor, the functions of the controller 815 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The controller 815 and/or at least some of its various sub-components may be physically located at various positions, including being distributed such that portions of functions are implemented at different physical locations by one or more physical devices. In some examples, the controller 815 and/or at least some of its various sub-components may be a separate and distinct component in accordance with various aspects of the present disclosure. In other examples, the controller 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

In some cases, the first data set receiving component 820 may receive, from a first data source, a first data set for a first set of user devices. The local segment identifying component 825 may identify, within the first set of user devices, a first subset of user devices characterized by a first set of attributes. The feature data set receiving component 830 may receive, from a second data source different from the first data source, a second data set for a second set of user devices characterized by a second set of attributes. The user device subset identifying component 835 may identify a second subset of user devices that belong to the first subset of user devices and the second set of user devices. The user device subset identifying component 835 may identify a third subset of user devices that belong to the first set of user devices and the second set of user devices. The reach index computing component 840 may compute a reach index outside of the first data set received from the first data source based on a first ratio of a first number of user devices in the third subset to a second number of user devices in the first set of user devices or the second set of user devices but not the third subset of user devices and based on a second ratio of a third number of user devices in the second subset of user devices to the first number of user devices in the third subset. The reach index indication component 845 may transmit, to a user device, an indication of the reach index outside of the first data set.

Additionally or alternatively, the first data set receiving component 820 may receive, from a first data source, a first data set for a first set of user devices. The local segment identifying component 825 may identify, within the first set of user devices, a first subset of user devices from the first set of user devices characterized by a first set of attributes. The feature data set receiving component 830 may receive, from a second data source different from the first data source, a second data set for a second set of user devices characterized by a second set of attributes. The user device subset identifying component 835 may identify a second subset of user devices that belong to the first subset of user devices and the second set of user devices and identify a third subset of user devices that belong to the first subset or an intersection of the first data set and the second data set but not the second subset of user devices. The reach index computing component 840 may compute a reach index within the first data set received from the first data source based on a ratio of a first number of user devices in the second subset to a second number of user devices in the third subset. The reach index indication component 845 may transmit, to a user device, an indication of the reach index within the first data set.

The output module 850 may manage output signals for the apparatus 805. For example, the output module 850 may receive signals from other components of the apparatus 805, such as the controller 815, and may transmit these signals to other components or devices. In some specific examples, the output module 850 may transmit output signals for display in a user interface, for storage in a database or data store, for further processing at a server or server cluster, or for any other processes at any number of devices or systems. In some cases, the output module 850 may be a component of an I/O controller 1015 as described with reference to FIG. 10.

Figure 9:
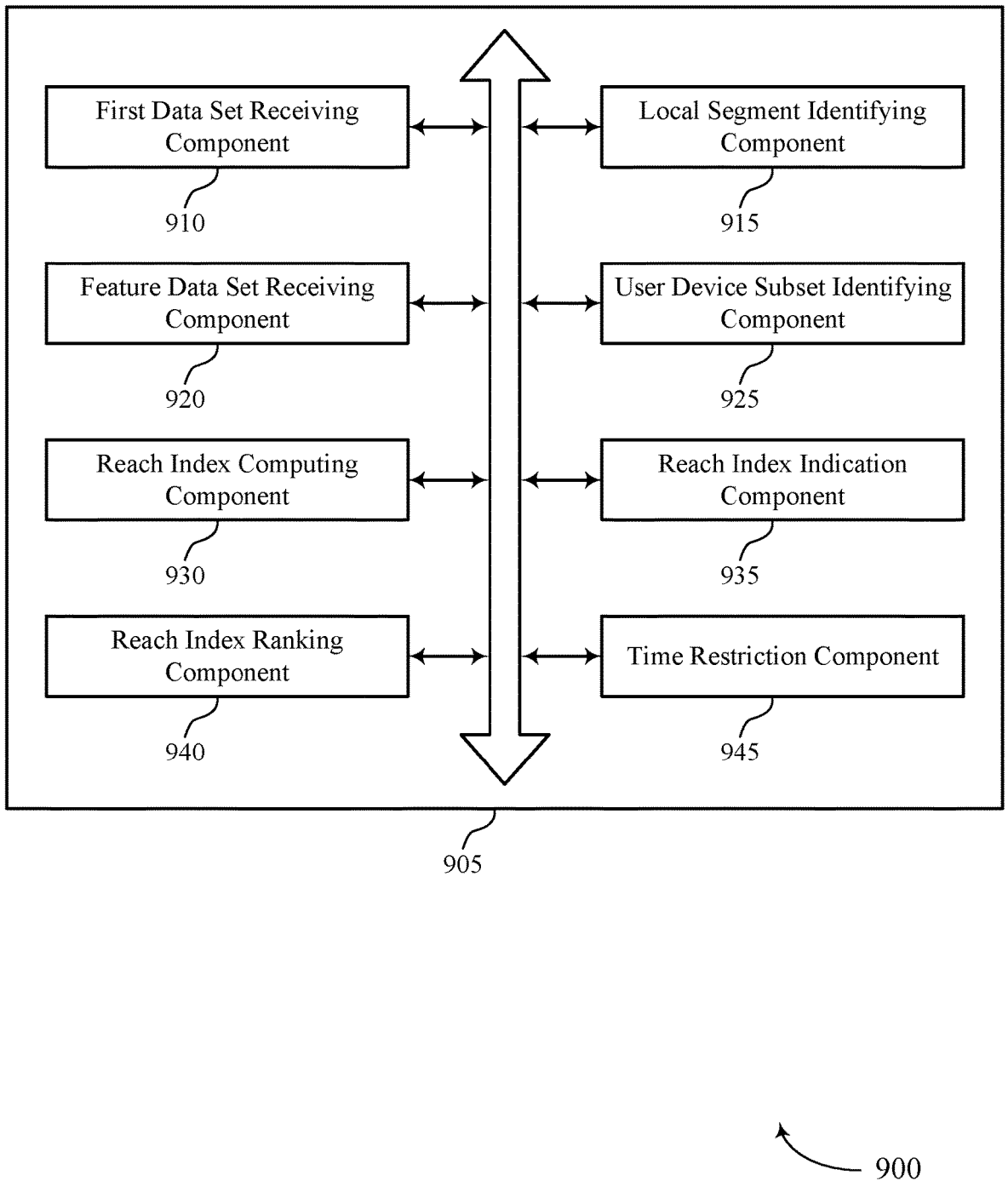
FIG. 9 shows a block diagram of a controller that supports correlating user device attribute groups in accordance with aspects of the present disclosure.

FIG. 9 shows a block diagram 900 of a controller 905 that supports correlating user device attribute groups in accordance with aspects of the present disclosure. The controller 905 may be an example of aspects of a controller 815 or a controller 1010 described herein. The controller 905 may include a first data set receiving component 910, a local segment identifying component 915, a feature data set receiving component 920, a user device subset identifying component 925, a reach index computing component 930, a reach index indication component 935, a reach index ranking component 940, and a time restriction component 945. Each of these modules may communicate, directly or indirectly, with one another (e.g., via one or more buses). In some cases, the controller 905 may support data processing at a database server.

The first data set receiving component 910 may receive, from a first data source, a first data set for a first set of user devices. In some cases, the first data source is a multi-tenant database, and each user device of the first set of user devices corresponds to one or more tenants of the multi-tenant database.

The local segment identifying component 915 may identify, within the first set of user devices, a first subset of user devices characterized by a first set of attributes. In some examples, the local segment identifying component 915 may receive, from the user device, an indicator for the first set of attributes, where the first subset of user devices is identified based on receiving the indicator from the user device.

The feature data set receiving component 920 may receive, from a second data source different from the first data source, a second data set for a second set of user devices characterized by a second set of attributes. In some examples, the feature data set receiving component 920 may receive, from the user device, an indicator for the second set of attributes, where the second data set is received from the second data source based on receiving the indicator from the user device.

The user device subset identifying component 925 may identify a second subset of user devices that belong to the first subset of user devices and the second set of user devices. In some examples, the user device subset identifying component 925 may identify a third subset of user devices that belong to the first set of user devices and the second set of user devices.

The reach index computing component 930 may compute, by the database server, a reach index outside of the first data set received from the first data source based on a first ratio of a first number of user devices in the third subset to a second number of user devices in the first set of user devices or the second set of user devices but not the third subset of user devices and based on a second ratio of a third number of user devices in the second subset of user devices to the first number of user devices in the third subset. In some examples, the reach index computing component 930 may determine, based on the first ratio, a Jaccard index of the first data set received from the first data source and the second data set received from the second data source.

The reach index indication component 935 may transmit, to a user device, an indication of the reach index outside of the first data set. In some examples, the reach index indication component 935 may apply a binary entropy of information function to the determined Jaccard index, where the second ratio of the third number of user devices to the first number of user devices is applied to the binary entropy of information function. In some cases, the indication of the reach index outside of the first data set includes one or more of an overlap index between the first subset of user devices and the second set of user devices of the second data set or a number of untapped devices outside of the first set of user devices.

The reach index ranking component 940 may receive, from the second data source, a third data set for a third set of user devices characterized by a third set of attributes. In some examples, the reach index ranking component 940 may identify a fourth subset of user devices that belong to the first subset of user devices and the third set of user devices. In some examples, the reach index ranking component 940 may identify a fifth subset of user devices that belong to the first set of user devices and the third set of user devices.

In some examples, the reach index ranking component 940 may compute a second reach index outside of the first data set received from the first data source based on a third ratio of a fourth number of user devices in the fifth subset to a fifth number of user devices in the first set of user devices or the third set of user devices but not the fifth subset of user devices and based on a fourth ratio of a sixth number of user devices in the fourth subset of user devices to the fourth number of user devices in the fifth subset.

In some examples, the reach index ranking component 940 may determine that the first reach index outside of the first data set is greater than the second reach index outside of the first data set, where the indication of the first reach index outside of the first data set is transmitted based on the determining. In some examples, the reach index ranking component 940 may rank the first reach index with one or more other reach indexes, where transmitting the indication of the first reach index is based on the ranking.

The time restriction component 945 may configure a time restriction on the first data set, where each user device of the first set of user devices has been active within the first data set within the time restriction.

In some examples, the first data set receiving component 910 may receive, from a first data source, a first data set for a first set of user devices. In some examples, the local segment identifying component 915 may identify, within the first set of user devices, a first subset of user devices from the first set of user devices characterized by a first set of attributes. In some examples, the local segment identifying component 915 may receive, from the user device, an indicator for the first set of attributes, where the first subset of user devices is identified based on receiving the indicator from the user device.

In some examples, the feature data set receiving component 920 may receive, from a second data source different from the first data source, a second data set for a second set of user devices characterized by a second set of attributes. In some examples, the feature data set receiving component 920 may receive, from the user device, an indicator for the second set of attributes, where the second data set is received from the second data source based on receiving the indicator from the user device.

In some examples, the user device subset identifying component 925 may identify a second subset of user devices that belong to the first subset of user devices and the second set of user devices. In some examples, the user device subset identifying component 925 may identify a third subset of user devices that belong to the first subset or an intersection of the first data set and the second data set but not the second subset of user devices.

In some examples, the reach index computing component 930 may compute, by the database server, a reach index within the first data set received from the first data source based on a ratio of a first number of user devices in the second subset to a second number of user devices in the third subset. In some examples, the reach index computing component 930 may determine, based on the ratio, a Jaccard index of the second subset of user devices and the third subset of user devices. In some examples, the reach index computing component 930 may apply a binary entropy of information function to the determined Jaccard index. In some examples, the reach index indication component 935 may transmit, to a user device, an indication of the reach index within the first data set.

In some examples, the reach index ranking component 940 may receive, from the second data source, a third data set for a third set of user devices characterized by a third set of attributes. In some examples, the reach index ranking component 940 may identify a fourth subset of user devices that belong to the first subset of user devices and the third set of user devices. In some examples, the reach index ranking component 940 may identify a fifth subset of user devices that belong to the first subset or an intersection of the first data set and the third data set but not the fourth subset of user devices. In some examples, the reach index ranking component 940 may compute a second reach index within the first data set received from the first data source based on a ratio of a third number of user devices in the fourth subset to a fourth number of user devices in the fifth subset.

In some examples, the reach index ranking component 940 may determine that the first reach index within the first data set is greater than the second reach index within the first data set, where the indication of the first reach index within the first data set is transmitted based on the determining. In some examples, the reach index ranking component 940 may rank the first reach index with one or more other reach indexes, where transmitting the indication of the first reach index is based on the ranking. In some examples, the time restriction component 945 may configure a time restriction on the first data set, where each user device of the first set of user devices has been active within the first data set within the time restriction.

Figure 10:
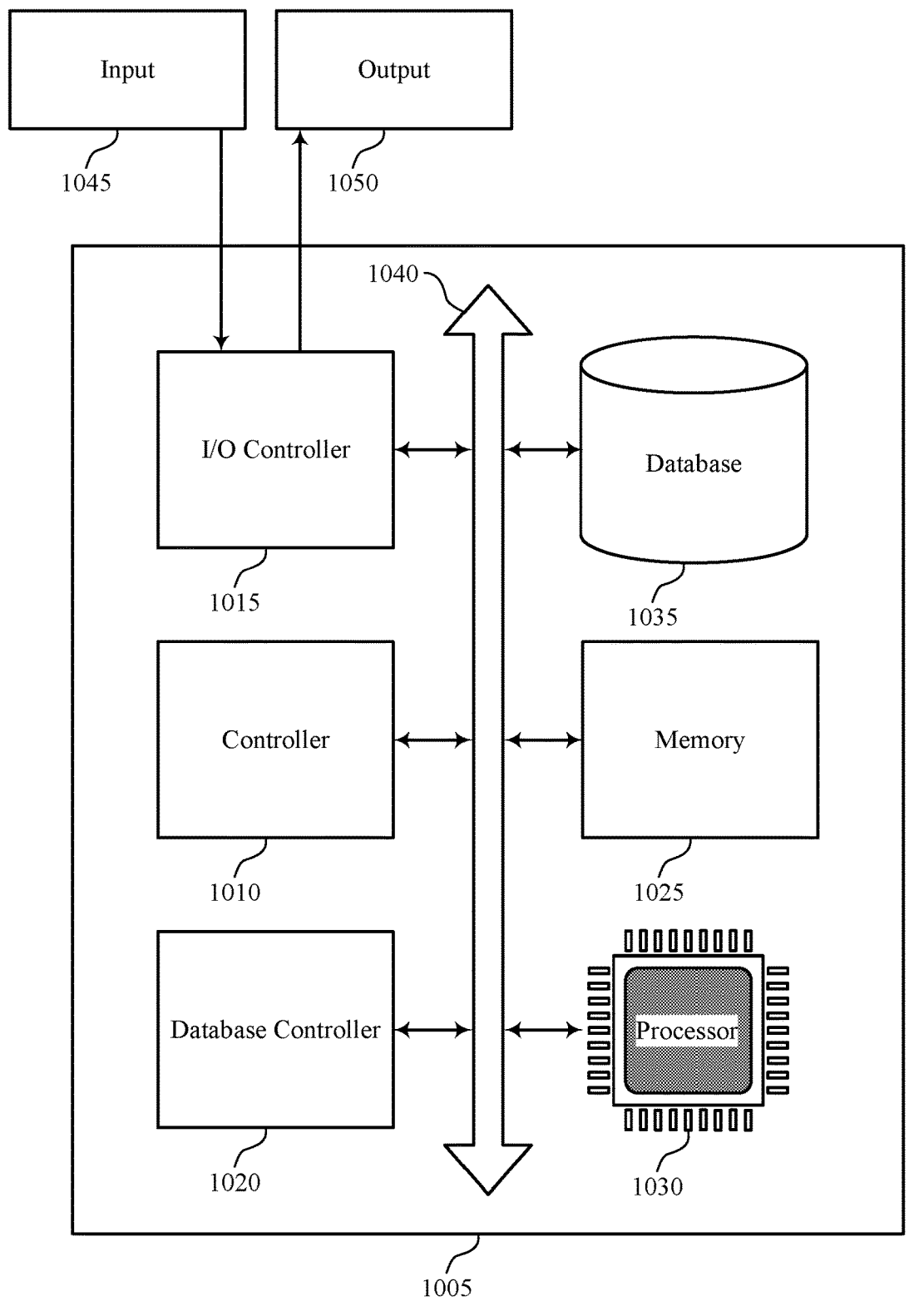
FIG. 10 shows a diagram of a system including a device that supports correlating user device attribute groups in accordance with aspects of the present disclosure.

FIG. 10 shows a diagram of a system 1000 including a device 1005 that supports correlating user device attribute groups in accordance with aspects of the present disclosure. The device 1005 may be an example of or include the components of a database server or an apparatus 805 as described herein. The device 1005 may include components for bi-directional data communications including components for transmitting and receiving communications, including a controller 1010, an I/O controller 1015, a database controller 1020, memory 1025, a processor 1030, and a database 1035. These components may be in electronic communication via one or more buses (e.g., bus 1040).

The controller 1010 may be an example of a controller 815 or 905 as described herein. For example, the controller 1010 may perform any of the methods or processes described above with reference to FIGS. 8 and 9. In some cases, the controller 1010 may be implemented in hardware, software executed by a processor, firmware, or any combination thereof.

The I/O controller 1015 may manage input signals 1045 and output signals 1050 for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The database controller 1020 may manage data storage and processing in a database 1035. In some cases, a user may interact with the database controller 1020. In other cases, the database controller 1020 may operate automatically without user interaction. The database 1035 may be an example of a single database, a distributed database, multiple distributed databases, a data store, a data lake, or an emergency backup database.

Memory 1025 may include random-access memory (RAM) and read-only memory (ROM). The memory 1025 may store computer-readable, computer-executable software including instructions that, when executed, cause the processor to perform various functions described herein. In some cases, the memory 1025 may contain, among other things, a basic I/O system (BIOS) which may control basic hardware or software operation such as the interaction with peripheral components or devices.

The processor 1030 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1030 may be configured to operate a memory array using a memory controller. In other cases, a memory controller may be integrated into the processor 1030. The processor 1030 may be configured to execute computer-readable instructions stored in a memory 1025 to perform various functions (e.g., functions or tasks supporting correlating user device attribute groups).

Figure 11:
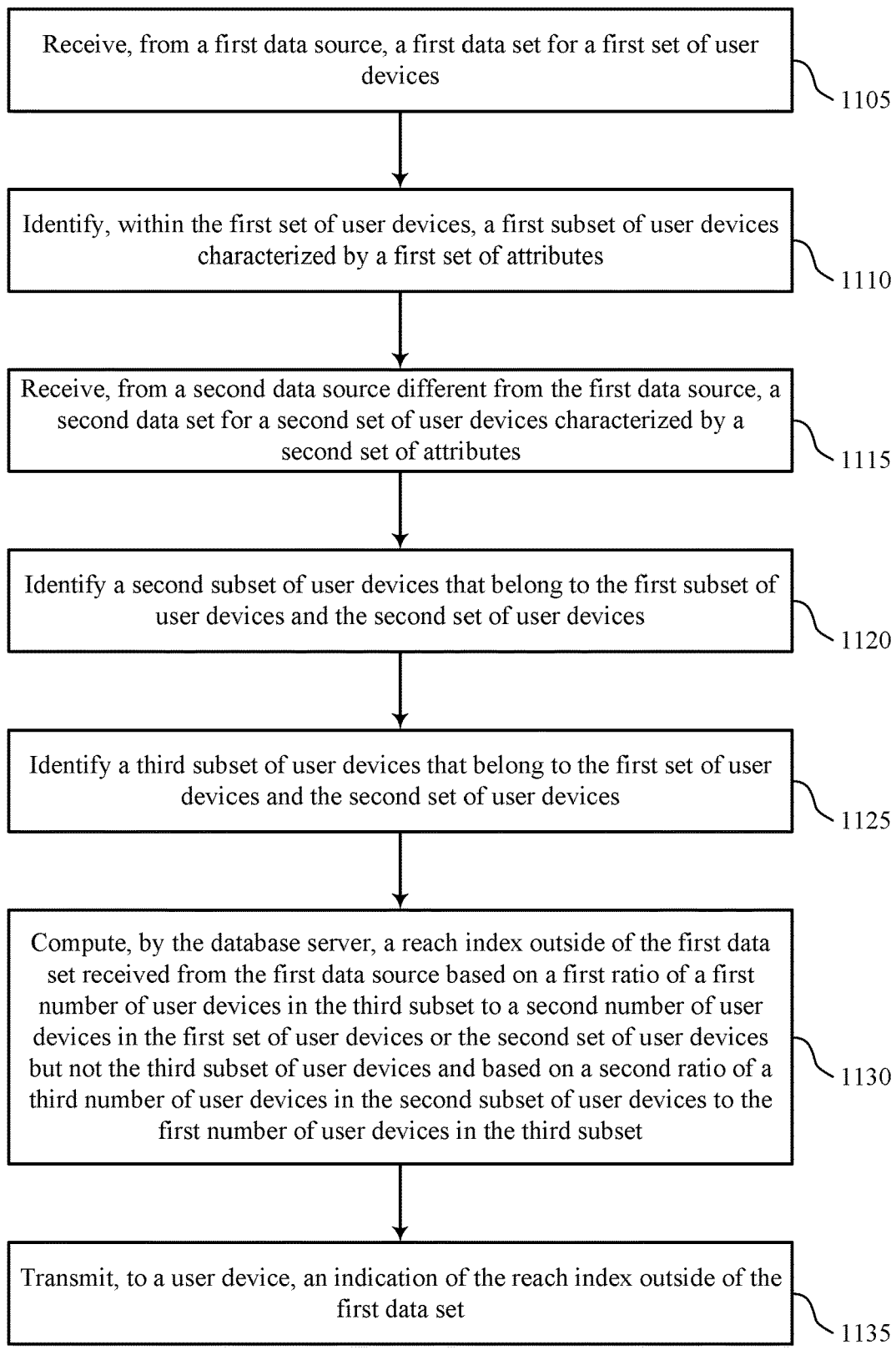
FIGS. 11 through 14 show flowcharts illustrating methods that support correlating user device attribute groups in accordance with aspects of the present disclosure.

FIG. 11 shows a flowchart illustrating a method 1100 that supports correlating user device attribute groups in accordance with aspects of the present disclosure. The operations of method 1100 may be implemented by a database server or its components as described herein. For example, the operations of method 1100 may be performed by a controller as described with reference to FIGS. 8 through 10. In some examples, a database server may execute a set of instructions to control the functional elements of the database server to perform the functions described below. Additionally or alternatively, a database server may perform aspects of the functions described below using special-purpose hardware.

At 1105, the database server may receive, from a first data source, a first data set for a first set of user devices. The operations of 1105 may be performed according to the methods described herein. In some examples, aspects of the operations of 1105 may be performed by a first data set receiving component as described with reference to FIGS. 8 through 10.

At 1110, the database server may identify, within the first set of user devices, a first subset of user devices characterized by a first set of attributes. The operations of 1110 may be performed according to the methods described herein. In some examples, aspects of the operations of 1110 may be performed by a local segment identifying component as described with reference to FIGS. 8 through 10.

At 1115, the database server may receive, from a second data source different from the first data source, a second data set for a second set of user devices characterized by a second set of attributes. The operations of 1115 may be performed according to the methods described herein. In some examples, aspects of the operations of 1115 may be performed by a feature data set receiving component as described with reference to FIGS. 8 through 10.

At 1120, the database server may identify a second subset of user devices that belong to the first subset of user devices and the second set of user devices. The operations of 1120 may be performed according to the methods described herein. In some examples, aspects of the operations of 1120 may be performed by a user device subset identifying component as described with reference to FIGS. 8 through 10.

At 1125, the database server may identify a third subset of user devices that belong to the first set of user devices and the second set of user devices. The operations of 1125 may be performed according to the methods described herein. In some examples, aspects of the operations of 1125 may be performed by a user device subset identifying component as described with reference to FIGS. 8 through 10.

At 1130, the database server may compute a reach index outside of the first data set received from the first data source based on a first ratio of a first number of user devices in the third subset to a second number of user devices in the first set of user devices or the second set of user devices but not the third subset of user devices and based on a second ratio of a third number of user devices in the second subset of user devices to the first number of user devices in the third subset. The operations of 1130 may be performed according to the methods described herein. In some examples, aspects of the operations of 1130 may be performed by a reach index computing component as described with reference to FIGS. 8 through 10.

At 1135, the database server may transmit, to a user device, an indication of the reach index outside of the first data set. The operations of 1135 may be performed according to the methods described herein. In some examples, aspects of the operations of 1135 may be performed by a reach index indication component as described with reference to FIGS. 8 through 10.

Figure 12:
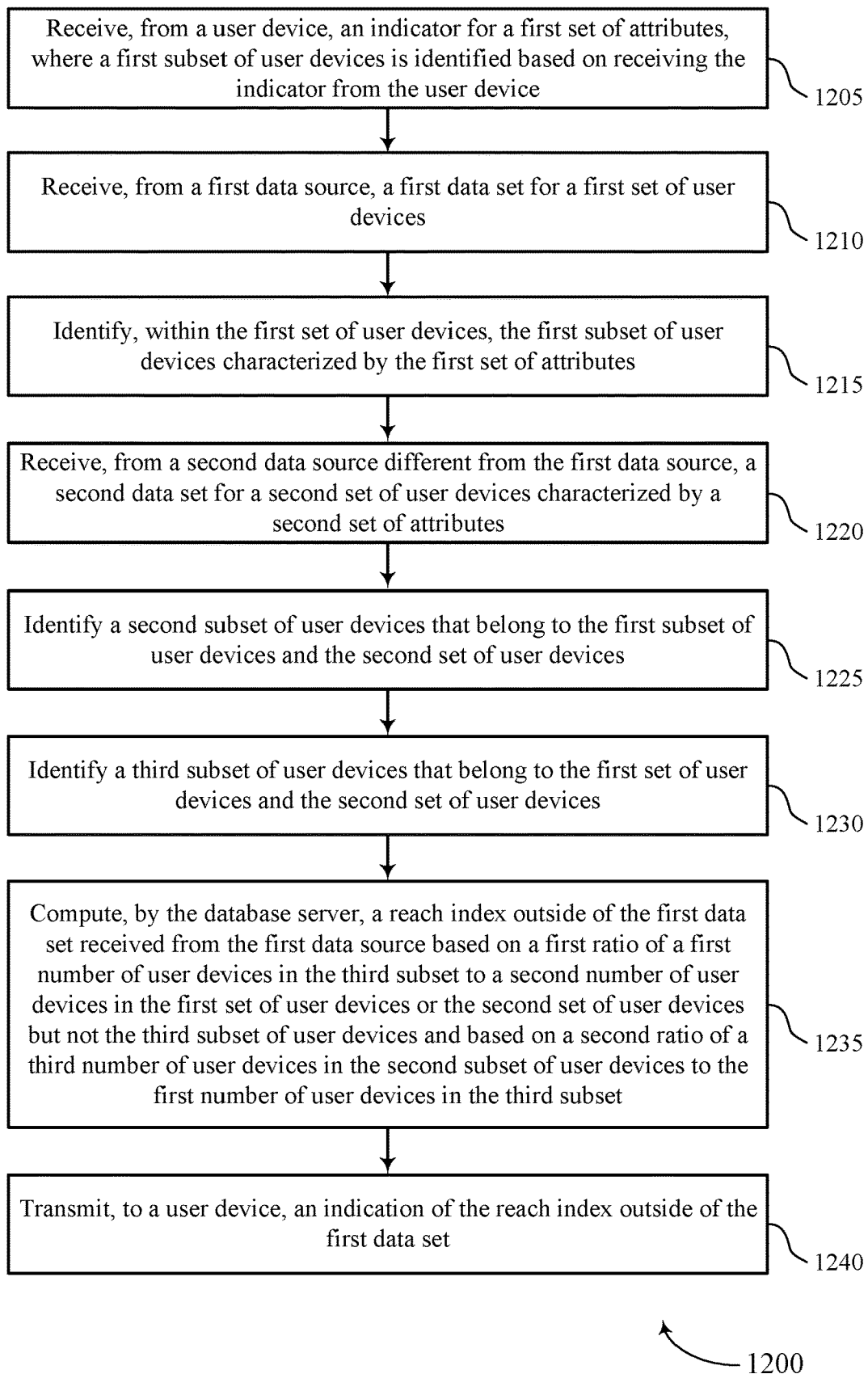

FIG. 12 shows a flowchart illustrating a method 1200 that supports correlating user device attribute groups in accordance with aspects of the present disclosure. The operations of method 1200 may be implemented by a database server or its components as described herein. For example, the operations of method 1200 may be performed by a controller as described with reference to FIGS. 8 through 10. In some examples, a database server may execute a set of instructions to control the functional elements of the database server to perform the functions described below. Additionally or alternatively, a database server may perform aspects of the functions described below using special-purpose hardware.

At 1205, the database server may receive, from a user device, an indicator for a first set of attributes, where a first subset of user devices is identified based on receiving the indicator from the user device. The operations of 1205 may be performed according to the methods described herein. In some examples, aspects of the operations of 1205 may be performed by a local segment identifying component as described with reference to FIGS. 8 through 10.

At 1210, the database server may receive, from a first data source, a first data set for a first set of user devices. The operations of 1210 may be performed according to the methods described herein. In some examples, aspects of the operations of 1210 may be performed by a first data set receiving component as described with reference to FIGS. 8 through 10.

At 1215, the database server may identify, within the first set of user devices, the first subset of user devices characterized by the first set of attributes. The operations of 1215 may be performed according to the methods described herein. In some examples, aspects of the operations of 1215 may be performed by a local segment identifying component as described with reference to FIGS. 8 through 10.

At 1220, the database server may receive, from a second data source different from the first data source, a second data set for a second set of user devices characterized by a second set of attributes. The operations of 1220 may be performed according to the methods described herein. In some examples, aspects of the operations of 1220 may be performed by a feature data set receiving component as described with reference to FIGS. 8 through 10.

At 1225, the database server may identify a second subset of user devices that belong to the first subset of user devices and the second set of user devices. The operations of 1225 may be performed according to the methods described herein. In some examples, aspects of the operations of 1225 may be performed by a user device subset identifying component as described with reference to FIGS. 8 through 10.

At 1230, the database server may identify a third subset of user devices that belong to the first set of user devices and the second set of user devices. The operations of 1230 may be performed according to the methods described herein. In some examples, aspects of the operations of 1230 may be performed by a user device subset identifying component as described with reference to FIGS. 8 through 10.

At 1235, the database server may compute a reach index outside of the first data set received from the first data source based on a first ratio of a first number of user devices in the third subset to a second number of user devices in the first set of user devices or the second set of user devices but not the third subset of user devices and based on a second ratio of a third number of user devices in the second subset of user devices to the first number of user devices in the third subset. The operations of 1235 may be performed according to the methods described herein. In some examples, aspects of the operations of 1235 may be performed by a reach index computing component as described with reference to FIGS. 8 through 10.

At 1240, the database server may transmit, to a user device (e.g., the user device that indicated the first set of attributes), an indication of the reach index outside of the first data set. The operations of 1240 may be performed according to the methods described herein. In some examples, aspects of the operations of 1240 may be performed by a reach index indication component as described with reference to FIGS. 8 through 10.

Figure 13:
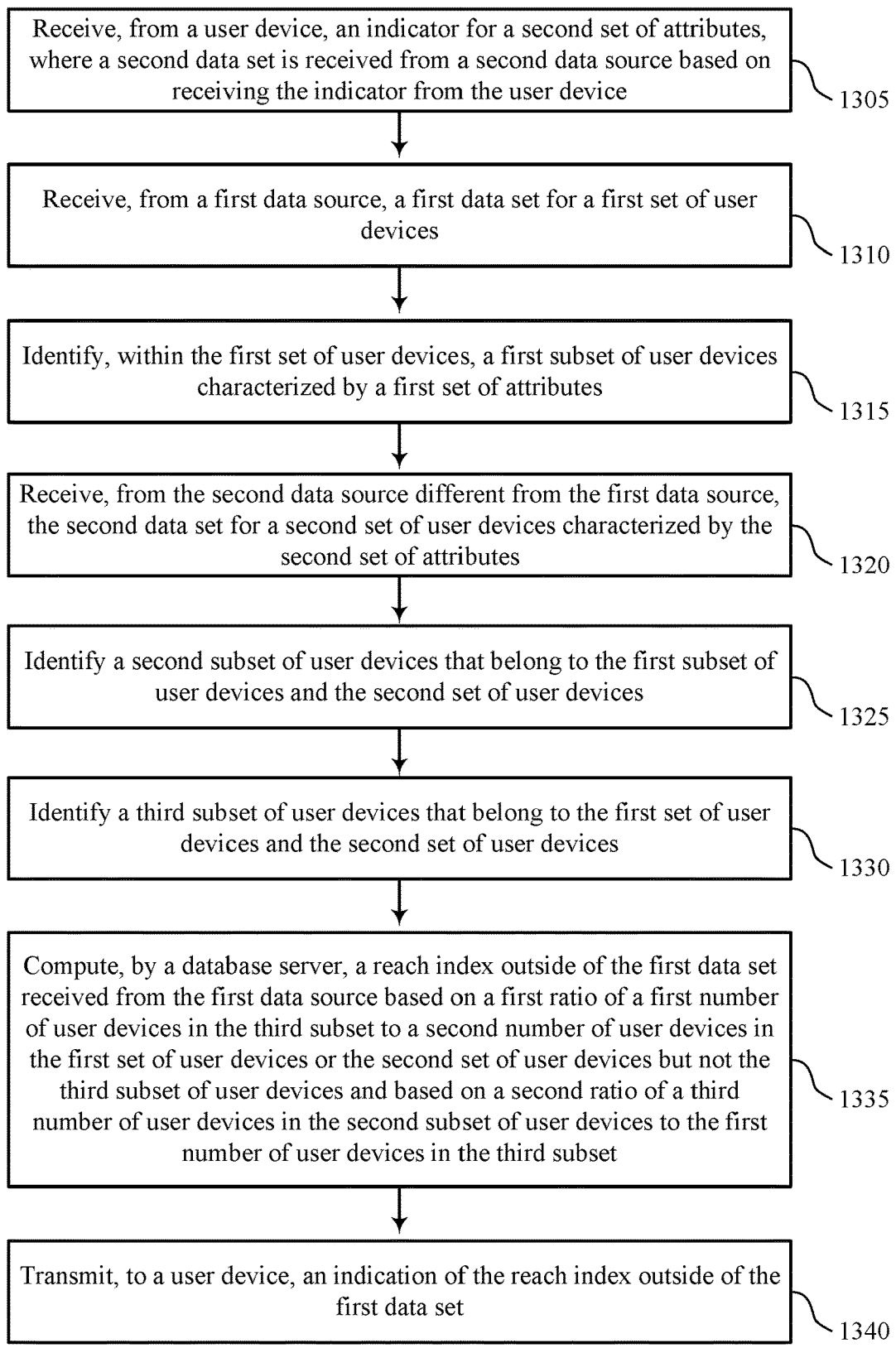

FIG. 13 shows a flowchart illustrating a method 1300 that supports correlating user device attribute groups in accordance with aspects of the present disclosure. The operations of method 1300 may be implemented by a database server or its components as described herein. For example, the operations of method 1300 may be performed by a controller as described with reference to FIGS. 8 through 10. In some examples, a database server may execute a set of instructions to control the functional elements of the database server to perform the functions described below. Additionally or alternatively, a database server may perform aspects of the functions described below using special-purpose hardware.

At 1305, the database server may receive, from a user device, an indicator for a second set of attributes, where a second data set is received from a second data source based on receiving the indicator from the user device. The operations of 1305 may be performed according to the methods described herein. In some examples, aspects of the operations of 1305 may be performed by a feature data set receiving component as described with reference to FIGS. 8 through 10.

At 1310, the database server may receive, from a first data source, a first data set for a first set of user devices. The operations of 1310 may be performed according to the methods described herein. In some examples, aspects of the operations of 1310 may be performed by a first data set receiving component as described with reference to FIGS. 8 through 10.

At 1315, the database server may identify, within the first set of user devices, a first subset of user devices characterized by a first set of attributes. The operations of 1315 may be performed according to the methods described herein. In some examples, aspects of the operations of 1315 may be performed by a local segment identifying component as described with reference to FIGS. 8 through 10.

At 1320, the database server may receive, from the second data source different from the first data source, the second data set for a second set of user devices characterized by the second set of attributes. The operations of 1320 may be performed according to the methods described herein. In some examples, aspects of the operations of 1320 may be performed by a feature data set receiving component as described with reference to FIGS. 8 through 10.

At 1325, the database server may identify a second subset of user devices that belong to the first subset of user devices and the second set of user devices. The operations of 1325 may be performed according to the methods described herein. In some examples, aspects of the operations of 1325 may be performed by a user device subset identifying component as described with reference to FIGS. 8 through 10.

At 1330, the database server may identify a third subset of user devices that belong to the first set of user devices and the second set of user devices. The operations of 1330 may be performed according to the methods described herein. In some examples, aspects of the operations of 1330 may be performed by a user device subset identifying component as described with reference to FIGS. 8 through 10.

At 1335, the database server may compute a reach index outside of the first data set received from the first data source based on a first ratio of a first number of user devices in the third subset to a second number of user devices in the first set of user devices or the second set of user devices but not the third subset of user devices and based on a second ratio of a third number of user devices in the second subset of user devices to the first number of user devices in the third subset. The operations of 1335 may be performed according to the methods described herein. In some examples, aspects of the operations of 1335 may be performed by a reach index computing component as described with reference to FIGS. 8 through 10.

At 1340, the database server may transmit, to a user device (e.g., the user device that indicated the second set of attributes), an indication of the reach index outside of the first data set. The operations of 1340 may be performed according to the methods described herein. In some examples, aspects of the operations of 1340 may be performed by a reach index indication component as described with reference to FIGS. 8 through 10.

Figure 14:
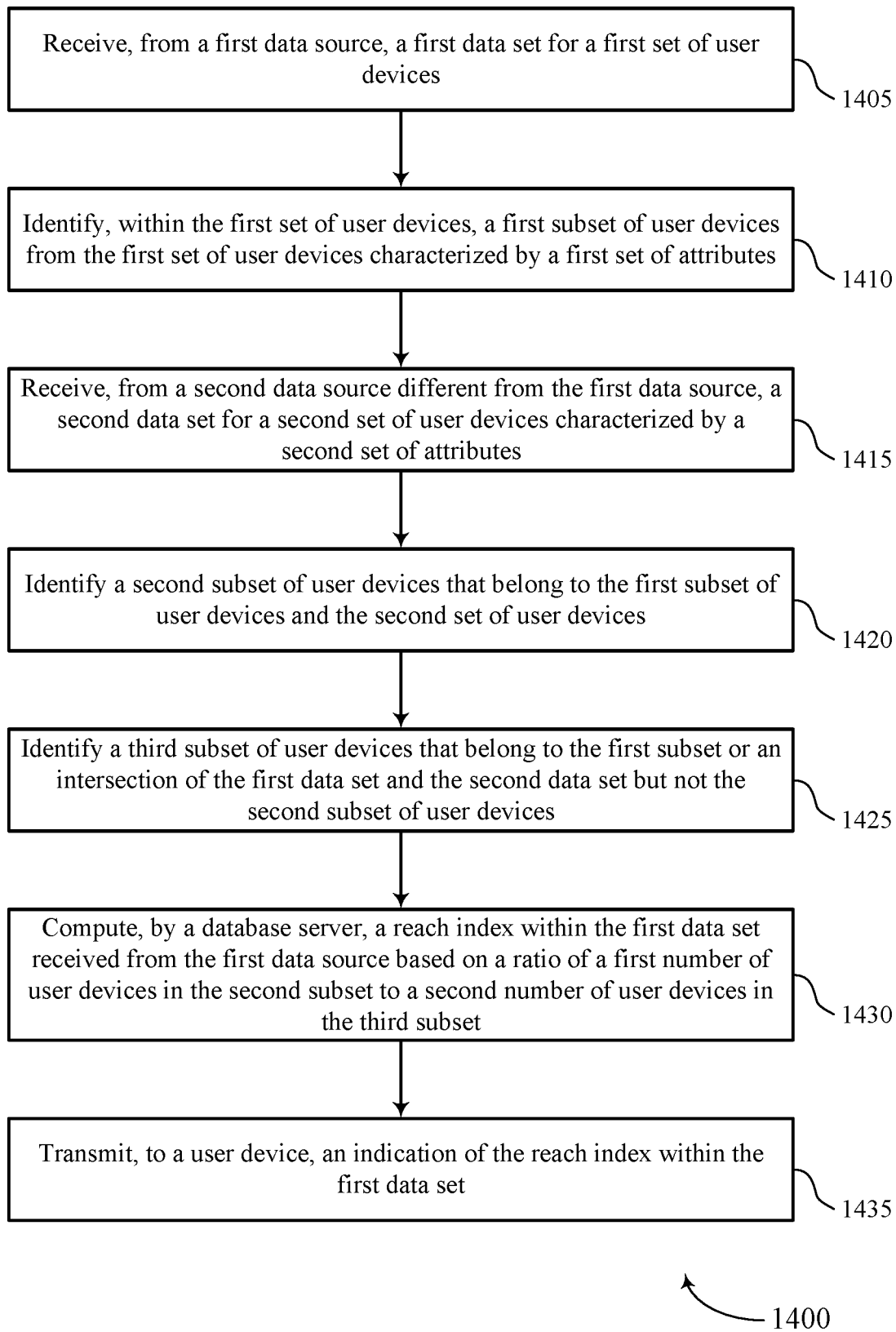

FIG. 14 shows a flowchart illustrating a method 1400 that supports correlating user device attribute groups in accordance with aspects of the present disclosure. The operations of method 1400 may be implemented by a database server or its components as described herein. For example, the operations of method 1400 may be performed by a controller as described with reference to FIGS. 8 through 10. In some examples, a database server may execute a set of instructions to control the functional elements of the database server to perform the functions described below. Additionally or alternatively, a database server may perform aspects of the functions described below using special-purpose hardware.

At 1405, the database server may receive, from a first data source, a first data set for a first set of user devices. The operations of 1405 may be performed according to the methods described herein. In some examples, aspects of the operations of 1405 may be performed by a first data set receiving component as described with reference to FIGS. 8 through 10.

At 1410, the database server may identify, within the first set of user devices, a first subset of user devices from the first set of user devices characterized by a first set of attributes. The operations of 1410 may be performed according to the methods described herein. In some examples, aspects of the operations of 1410 may be performed by a local segment identifying component as described with reference to FIGS. 8 through 10.

At 1415, the database server may receive, from a second data source different from the first data source, a second data set for a second set of user devices characterized by a second set of attributes. The operations of 1415 may be performed according to the methods described herein. In some examples, aspects of the operations of 1415 may be performed by a feature data set receiving component as described with reference to FIGS. 8 through 10.

At 1420, the database server may identify a second subset of user devices that belong to the first subset of user devices and the second set of user devices. The operations of 1420 may be performed according to the methods described herein. In some examples, aspects of the operations of 1420 may be performed by a user device subset identifying component as described with reference to FIGS. 8 through 10.

At 1425, the database server may identify a third subset of user devices that belong to the first subset or an intersection of the first data set and the second data set but not the second subset of user devices. The operations of 1425 may be performed according to the methods described herein. In some examples, aspects of the operations of 1425 may be performed by a user device subset identifying component as described with reference to FIGS. 8 through 10.

At 1430, the database server may compute a reach index within the first data set received from the first data source based on a ratio of a first number of user devices in the second subset to a second number of user devices in the third subset. The operations of 1430 may be performed according to the methods described herein. In some examples, aspects of the operations of 1430 may be performed by a reach index computing component as described with reference to FIGS. 8 through 10.

At 1435, the database server may transmit, to a user device, an indication of the reach index within the first data set. The operations of 1435 may be performed according to the methods described herein. In some examples, aspects of the operations of 1435 may be performed by a reach index indication component as described with reference to FIGS. 8 through 10.

A method for data processing at a database server is described. The method may include receiving, from a first data source, a first data set for a first set of user devices; identifying, within the first set of user devices, a first subset of user devices characterized by a first set of attributes; receiving, from a second data source different from the first data source, a second data set for a second set of user devices characterized by a second set of attributes; identifying a second subset of user devices that belong to the first subset of user devices and the second set of user devices; identifying a third subset of user devices that belong to the first set of user devices and the second set of user devices; computing, by the database server, a reach index outside of the first data set received from the first data source based on a first ratio of a first number of user devices in the third subset to a second number of user devices in the first set of user devices or the second set of user devices but not the third subset of user devices and based on a second ratio of a third number of user devices in the second subset of user devices to the first number of user devices in the third subset; and transmitting, to a user device, an indication of the reach index outside of the first data set.

An apparatus for data processing at a database server is described. The apparatus may include a processor, memory in electronic communication with the processor, and instructions stored in the memory. The instructions may be executable by the processor to cause the apparatus to receive, from a first data source, a first data set for a first set of user devices; identify, within the first set of user devices, a first subset of user devices characterized by a first set of attributes; receive, from a second data source different from the first data source, a second data set for a second set of user devices characterized by a second set of attributes; identify a second subset of user devices that belong to the first subset of user devices and the second set of user devices; identify a third subset of user devices that belong to the first set of user devices and the second set of user devices; compute, by the database server, a reach index outside of the first data set received from the first data source based on a first ratio of a first number of user devices in the third subset to a second number of user devices in the first set of user devices or the second set of user devices but not the third subset of user devices and based on a second ratio of a third number of user devices in the second subset of user devices to the first number of user devices in the third subset; and transmit, to a user device, an indication of the reach index outside of the first data set.

Another apparatus for data processing at a database server is described. The apparatus may include means for receiving, from a first data source, a first data set for a first set of user devices; identifying, within the first set of user devices, a first subset of user devices characterized by a first set of attributes; receiving, from a second data source different from the first data source, a second data set for a second set of user devices characterized by a second set of attributes; identifying a second subset of user devices that belong to the first subset of user devices and the second set of user devices; identifying a third subset of user devices that belong to the first set of user devices and the second set of user devices; computing, by the database server, a reach index outside of the first data set received from the first data source based on a first ratio of a first number of user devices in the third subset to a second number of user devices in the first set of user devices or the second set of user devices but not the third subset of user devices and based on a second ratio of a third number of user devices in the second subset of user devices to the first number of user devices in the third subset; and transmitting, to a user device, an indication of the reach index outside of the first data set.

A non-transitory computer-readable medium storing code for data processing at a database server is described. The code may include instructions executable by a processor to receive, from a first data source, a first data set for a first set of user devices; identify, within the first set of user devices, a first subset of user devices characterized by a first set of attributes; receive, from a second data source different from the first data source, a second data set for a second set of user devices characterized by a second set of attributes; identify a second subset of user devices that belong to the first subset of user devices and the second set of user devices; identify a third subset of user devices that belong to the first set of user devices and the second set of user devices; compute, by the database server, a reach index outside of the first data set received from the first data source based on a first ratio of a first number of user devices in the third subset to a second number of user devices in the first set of user devices or the second set of user devices but not the third subset of user devices and based on a second ratio of a third number of user devices in the second subset of user devices to the first number of user devices in the third subset; and transmit, to a user device, an indication of the reach index outside of the first data set.

In some examples of the method, apparatuses, and non-transitory computer-readable medium described herein, computing the reach index outside of the first data set may include operations, features, means, or instructions for determining, based on the first ratio, a Jaccard index of the first data set received from the first data source and the second data set received from the second data source and applying a binary entropy of information function to the determined Jaccard index, where the second ratio of the third number of user devices to the first number of user devices may be applied to the binary entropy of information function.

In some examples of the method, apparatuses, and non-transitory computer-readable medium described herein, the reach index is a first reach index. Some examples of the method, apparatuses, and non-transitory computer-readable medium described herein may further include operations, features, means, or instructions for receiving, from the second data source, a third data set for a third set of user devices characterized by a third set of attributes; identifying a fourth subset of user devices that belong to the first subset of user devices and the third set of user devices; identifying a fifth subset of user devices that belong to the first set of user devices and the third set of user devices; computing a second reach index outside of the first data set received from the first data source based on a third ratio of a fourth number of user devices in the fifth subset to a fifth number of user devices in the first set of user devices or the third set of user devices but not the fifth subset of user devices and based on a fourth ratio of a sixth number of user devices in the fourth subset of user devices to the fourth number of user devices in the fifth subset; and determining that the first reach index outside of the first data set is greater than the second reach index outside of the first data set, where the indication of the first reach index outside of the first data set may be transmitted based on the determining.

Some examples of the method, apparatuses, and non-transitory computer-readable medium described herein may further include operations, features, means, or instructions for ranking the first reach index with one or more other reach indexes, where transmitting the indication of the first reach index may be based on the ranking.

Some examples of the method, apparatuses, and non-transitory computer-readable medium described herein may further include operations, features, means, or instructions for receiving, from the user device, an indicator for the first set of attributes, where the first subset of user devices may be identified based on receiving the indicator from the user device.

Some examples of the method, apparatuses, and non-transitory computer-readable medium described herein may further include operations, features, means, or instructions for receiving, from the user device, an indicator for the second set of attributes, where the second data set may be received from the second data source based on receiving the indicator from the user device.

In some examples of the method, apparatuses, and non-transitory computer-readable medium described herein, the indication of the reach index outside of the first data set includes one or more of an overlap index between the first subset of user devices and the second set of user devices of the second data set or a number of untapped devices outside of the first set of user devices.

In some examples of the method, apparatuses, and non-transitory computer-readable medium described herein, the first data source may be a multi-tenant database, and each user device of the first set of user devices corresponds to one or more tenants of the multi-tenant database.

Some examples of the method, apparatuses, and non-transitory computer-readable medium described herein may further include operations, features, means, or instructions for configuring a time restriction on the first data set, where each user device of the first set of user devices may have been active within the first data set within the time restriction.

A method for data processing at a database server is described. The method may include receiving, from a first data source, a first data set for a first set of user devices; identifying, within the first set of user devices, a first subset of user devices from the first set of user devices characterized by a first set of attributes; receiving, from a second data source different from the first data source, a second data set for a second set of user devices characterized by a second set of attributes; identifying a second subset of user devices that belong to the first subset of user devices and the second set of user devices; identifying a third subset of user devices that belong to the first subset or an intersection of the first data set and the second data set but not the second subset of user devices; computing, by the database server, a reach index within the first data set received from the first data source based on a ratio of a first number of user devices in the second subset to a second number of user devices in the third subset; and transmitting, to a user device, an indication of the reach index within the first data set.

An apparatus for data processing at a database server is described. The apparatus may include a processor, memory in electronic communication with the processor, and instructions stored in the memory. The instructions may be executable by the processor to cause the apparatus to receive, from a first data source, a first data set for a first set of user devices; identify, within the first set of user devices, a first subset of user devices from the first set of user devices characterized by a first set of attributes; receive, from a second data source different from the first data source, a second data set for a second set of user devices characterized by a second set of attributes; identify a second subset of user devices that belong to the first subset of user devices and the second set of user devices; identify a third subset of user devices that belong to the first subset or an intersection of the first data set and the second data set but not the second subset of user devices; compute, by the database server, a reach index within the first data set received from the first data source based on a ratio of a first number of user devices in the second subset to a second number of user devices in the third subset; and transmit, to a user device, an indication of the reach index within the first data set.

Another apparatus for data processing at a database server is described. The apparatus may include means for receiving, from a first data source, a first data set for a first set of user devices; identifying, within the first set of user devices, a first subset of user devices from the first set of user devices characterized by a first set of attributes; receiving, from a second data source different from the first data source, a second data set for a second set of user devices characterized by a second set of attributes; identifying a second subset of user devices that belong to the first subset of user devices and the second set of user devices; identifying a third subset of user devices that belong to the first subset or an intersection of the first data set and the second data set but not the second subset of user devices; computing, by the database server, a reach index within the first data set received from the first data source based on a ratio of a first number of user devices in the second subset to a second number of user devices in the third subset; and transmitting, to a user device, an indication of the reach index within the first data set.

A non-transitory computer-readable medium storing code for data processing at a database server is described. The code may include instructions executable by a processor to receive, from a first data source, a first data set for a first set of user devices; identify, within the first set of user devices, a first subset of user devices from the first set of user devices characterized by a first set of attributes; receive, from a second data source different from the first data source, a second data set for a second set of user devices characterized by a second set of attributes; identify a second subset of user devices that belong to the first subset of user devices and the second set of user devices; identify a third subset of user devices that belong to the first subset or an intersection of the first data set and the second data set but not the second subset of user devices; compute, by the database server, a reach index within the first data set received from the first data source based on a ratio of a first number of user devices in the second subset to a second number of user devices in the third subset; and transmit, to a user device, an indication of the reach index within the first data set.

In some examples of the method, apparatuses, and non-transitory computer-readable medium described herein, computing the reach index within the first data set may include operations, features, means, or instructions for determining, based on the ratio, a Jaccard index of the second subset of user devices and the third subset of user devices and applying a binary entropy of information function to the determined Jaccard index.

In some examples of the method, apparatuses, and non-transitory computer-readable medium described herein, the reach index is a first reach index. Some examples of the method, apparatuses, and non-transitory computer-readable medium described herein may further include operations, features, means, or instructions for receiving, from the second data source, a third data set for a third set of user devices characterized by a third set of attributes; identifying a fourth subset of user devices that belong to the first subset of user devices and the third set of user devices; identifying a fifth subset of user devices that belong to the first subset or an intersection of the first data set and the third data set but not the fourth subset of user devices; computing a second reach index within the first data set received from the first data source based on a ratio of a third number of user devices in the fourth subset to a fourth number of user devices in the fifth subset; and determining that the first reach index within the first data set may be greater than the second reach index within the first data set, where the indication of the first reach index within the first data set may be transmitted based on the determining.

Some examples of the method, apparatuses, and non-transitory computer-readable medium described herein may further include operations, features, means, or instructions for ranking the first reach index with one or more other reach indexes, where transmitting the indication of the first reach index may be based on the ranking.

Some examples of the method, apparatuses, and non-transitory computer-readable medium described herein may further include operations, features, means, or instructions for receiving, from the user device, an indicator for the first set of attributes, where the first subset of user devices may be identified based on receiving the indicator from the user device.

Some examples of the method, apparatuses, and non-transitory computer-readable medium described herein may further include operations, features, means, or instructions for receiving, from the user device, an indicator for the second set of attributes, where the second data set may be received from the second data source based on receiving the indicator from the user device.

Some examples of the method, apparatuses, and non-transitory computer-readable medium described herein may further include operations, features, means, or instructions for configuring a time restriction on the first data set, where each user device of the first set of user devices may have been active within the first data set within the time restriction.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing at a database server, comprising:
   receiving, from a first data source, a first data set for a first set of user devices;
   identifying, within the first set of user devices, a first subset of user devices characterized by a first set of attributes;
   receiving, from a second data source different from the first data source, a second data set for a second set of user devices characterized by a second set of attributes;
   identifying, for a reach analysis, a second subset of user devices that belong to the first subset of user devices and the second set of user devices;
   identifying, for the reach analysis, a third subset of user devices that belong to the first set of user devices and the second set of user devices;
   computing, by the database server and for the reach analysis, a reach index outside of the first data set received from the first data source based at least in part on a first ratio of a first number of user devices in the third subset to a second number of user devices in the first set of user devices or the second set of user devices but not the third subset of user devices and based at least in part on a second ratio of a third number of user devices in the second subset of user devices to the first number of user devices in the third subset, wherein the computing comprises:
      determining, based at least in part on the first ratio, a Jaccard index of the first data set received from the first data source and the second data set received from the second data source; and
      applying a binary entropy of information function to the determined Jaccard index, wherein the second ratio is applied to the binary entropy of information function; and
   transmitting, to a user device, an indication of the reach index outside of the first data set based at least in part on a result of the reach analysis, wherein the reach index indicates a quantity of user devices outside of the first set of user devices targeted to join the first subset of user devices in the first set of user devices.

2. The method of claim 1, wherein the reach index is a first reach index, the method further comprising:
   receiving, from the second data source, a third data set for a third set of user devices characterized by a third set of attributes;
   identifying a fourth subset of user devices that belong to the first subset of user devices and the third set of user devices;
   identifying a fifth subset of user devices that belong to the first set of user devices and the third set of user devices;
   computing a second reach index outside of the first data set received from the first data source based at least in part on a third ratio of a fourth number of user devices in the fifth subset to a fifth number of user devices in the first set of user devices or the third set of user devices but not the fifth subset of user devices and based at least in part on a fourth ratio of a sixth number of user devices in the fourth subset of user devices to the fourth number of user devices in the fifth subset; and
   determining that the first reach index outside of the first data set is greater than the second reach index outside of the first data set, wherein the indication of the first reach index outside of the first data set is transmitted based at least in part on the determining.

3. The method of claim 2, further comprising:
   ranking the first reach index with one or more other reach indexes, wherein transmitting the indication of the first reach index is based at least in part on the ranking.

4. The method of claim 1, further comprising:
   receiving, from the user device, an indicator for the first set of attributes, wherein the first subset of user devices is identified based at least in part on receiving the indicator from the user device.

5. The method of claim 1, further comprising:
   receiving, from the user device, an indicator for the second set of attributes, wherein the second data set is received from the second data source based at least in part on receiving the indicator from the user device.

6. The method of claim 1, wherein the indication of the reach index outside of the first data set comprises one or more of an overlap index between the first subset of user devices and the second set of user devices of the second data set or a number of untapped devices outside of the first set of user devices.

7. The method of claim 1, wherein the first data source is a multi-tenant database, and each user device of the first set of user devices corresponds to one or more tenants of the multi-tenant database.

8. The method of claim 1, further comprising:
   configuring a time restriction on the first data set, wherein each user device of the first set of user devices has been active within the first data set within the time restriction.

9. A method for data processing at a database server, comprising: receiving, from a first data source, a first data set for a first set of user devices; identifying, within the first set of user devices, a first subset of user devices from the first set of user devices characterized by a first set of attributes;
   receiving, from a second data source different from the first data source, a second data set for a second set of user devices characterized by a second set of attributes;
   identifying, for a reach analysis, a second subset of user devices that belong to the first subset of user devices and the second set of user devices;
   identifying, for the reach analysis, a third subset of user devices that belong to the first subset or an intersection of the first data set and the second data set but not the second subset of user devices;
   computing, by the database server and for the reach analysis, a reach index within the first data set received from the first data source based at least in part on a ratio of a first number of user devices in the second subset to a second number of user devices in the third subset, wherein the computing comprises: determining, based at least in part on the ratio, a Jaccard index of the second subset of user devices and the third subset of user devices; and applying a binary entropy of information function to the determined Jaccard index; and transmitting, to a user device, an indication of the reach index within the first data set based at least in part on a result of the reach analysis, wherein the reach index indicates a quantity of user devices within the first set of user devices targeted to join the first subset of user devices in the first set of user devices.

10. The method of claim 9, wherein the reach index is a first reach index, the method further comprising:

receiving, from the second data source, a third data set for a third set of user devices characterized by a third set of attributes;

identifying a fourth subset of user devices that belong to the first subset of user devices and the third set of user devices;

identifying a fifth subset of user devices that belong to the first subset or an intersection of the first data set and the third data set but not the fourth subset of user devices;

computing a second reach index within the first data set received from the first data source based at least in part on a ratio of a third number of user devices in the fourth subset to a fourth number of user devices in the fifth subset; and determining that the first reach index within the first data set is greater than the second reach index within the first data set, wherein the indication of the first reach index within the first data set is transmitted based at least in part on the determining.

11. The method of claim 10, further comprising:
ranking the first reach index with one or more other reach indexes, wherein transmitting the indication of the first reach index is based at least in part on the ranking.

12. The method of claim 9, further comprising:
receiving, from the user device, an indicator for the first set of attributes, wherein the first subset of user devices is identified based at least in part on receiving the indicator from the user device.

13. The method of claim 9, further comprising:
receiving, from the user device, an indicator for the second set of attributes, wherein the second data set is received from the second data source based at least in part on receiving the indicator from the user device.

14. The method of claim 9, further comprising:
configuring a time restriction on the first data set, wherein each user device of the first set of user devices has been active within the first data set within the time restriction.

15. An apparatus for data processing at a database server, comprising: a processor; memory in electronic communication with the processor; and instructions stored in the memory and executable by the processor to cause the apparatus to: receive, from a first data source, a first data set for a first set of user devices; identify, within the first set of user devices, a first subset of user devices characterized by a first set of attributes;

receive, from a second data source different from the first data source, a second data set for a second set of user devices characterized by a second set of attributes;

identify, for a reach analysis, a second subset of user devices that belong to the first subset of user devices and the second set of user devices;

identify, for the reach analysis a third subset of user devices that belong to the first set of user devices and the second set of user devices;

compute, by the database server and for the reach analysis, a reach index outside of the first data set received from the first data source based at least in part on a first ratio of a first number of user devices in the third subset to a second number of user devices in the first set of user devices or the second set of user devices but not the third subset of user devices and based at least in part on a second ratio of a third number of user devices in the second subset of user devices to the first number of user devices in the third subset, wherein the instructions executable by the processor to cause the apparatus to compute the reach index outside of the first data set are further executable to cause the apparatus to: determine, based at least in part on the first ratio, a Jaccard index of the first data set received from the first data source and the second data set received from the second data source; and apply a binary entropy of information function to the determined Jaccard index, wherein the second ratio is applied to the binary entropy of information function; and transmit, to a user device, an indication of the reach index outside of the first data set based at least in part on a result of the reach analysis, wherein the reach index indicates a quantity of user devices outside of the first set of user devices targeted to join the first subset of user devices in the first set of user devices.

16. The apparatus of claim 15, wherein the reach index is a first reach index, and the instructions are further executable to cause the apparatus to:

receive, from the second data source, a third data set for a third set of user devices characterized by a third set of attributes;

identify a fourth subset of user devices that belong to the first subset of user devices and the third set of user devices;

identify a fifth subset of user devices that belong to the first set of user devices and the third set of user devices;

compute a second reach index outside of the first data set received from the first data source based at least in part on a third ratio of a fourth number of user devices in the fifth subset to a fifth number of user devices in the first set of user devices or the third set of user devices but not the fifth subset of user devices and based at least in part on a fourth ratio of a sixth number of user devices in the fourth subset of user devices to the fourth number of user devices in the fifth subset; and determine that the first reach index outside of the first data set is greater than the second reach index outside of the first data set, wherein the indication of the first reach index outside of the first data set is transmitted based at least in part on the determining.

17. The apparatus of claim 16, the instructions further executable to cause the apparatus to:

rank the first reach index with one or more other reach indexes, wherein transmitting the indication of the first reach index is based at least in part on the ranking.

* * * * *